United States Patent
Yamada

(10) Patent No.: US 10,152,769 B2
(45) Date of Patent: Dec. 11, 2018

(54) IMAGE PROCESSING METHOD AND IMAGE PROCESSOR

(71) Applicant: JVC KENWOOD Corporation, Yokohama-shi, Kanagawa (JP)

(72) Inventor: Kunio Yamada, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 83 days.

(21) Appl. No.: 15/348,158

(22) Filed: Nov. 10, 2016

(65) Prior Publication Data

US 2017/0213317 A1 Jul. 27, 2017

(30) Foreign Application Priority Data

Jan. 25, 2016 (JP) ................................. 2016-011644

(51) Int. Cl.
  *G06T 3/40* (2006.01)
(52) U.S. Cl.
  CPC .............. *G06T 3/40* (2013.01); *G06T 3/4053* (2013.01)
(58) Field of Classification Search
  None
  See application file for complete search history.

(56) References Cited

U.S. PATENT DOCUMENTS

| | | | |
|---|---|---|---|
| 5,504,531 A * | 4/1996 | Knee ..................... | H04N 7/0132 348/448 |
| 7,142,239 B2 * | 11/2006 | Cho ........................ | H04N 9/045 348/273 |
| 8,199,223 B2 * | 6/2012 | Sasaki .................. | G06K 9/6212 348/241 |
| 2006/0045385 A1 * | 3/2006 | Nishimura ............ | G06T 3/4007 382/300 |
| 2008/0166068 A1 * | 7/2008 | Fuchigami ............ | G06T 3/4007 382/300 |
| 2010/0134518 A1 * | 6/2010 | Moriya .................. | G06T 3/4053 345/660 |
| 2013/0121611 A1 * | 5/2013 | Moriya ................... | G06T 3/403 382/266 |

FOREIGN PATENT DOCUMENTS

JP 5327176 B2 10/2013

* cited by examiner

*Primary Examiner* — Yu Chen
(74) *Attorney, Agent, or Firm* — BRUNDIDGE & STANGER, P.C.

(57) ABSTRACT

An image processing method is provided. Calculating sums of differences identified between a pixel value of a pixel of interest in an input image and pixel values of three pixels surrounding the pixel of interest. Calculating an average value of four pixel difference sums calculated by the pixel difference sum calculators. Calculating deviations between the average value and the four pixel difference sums calculated by the pixel difference sum calculators. Deriving a minimum coefficient from the candidates of coefficient calculated by a candidate coefficient calculator by using adjusted deviations derived from multiplying the deviations by a constant. Subtracting values derived from multiplying the adjusted deviations by the minimum coefficient from the pixel value of the pixel of interest in the input image and outputting values of four pixels in an enlarged image twice an original size of the input image in horizontal and vertical directions.

6 Claims, 11 Drawing Sheets

FIG. 3

| 0 | 1 | 2 |
|---|---|---|
| 3 | 4 | 5 |
| 6 | 7 | 8 |

FIG. 4

| 0al | 0ar | 1al | 1ar | 2al | 2ar |
|-----|-----|-----|-----|-----|-----|
| 0bl | 0br | 1bl | 1br | 2bl | 2br |
| 3al | 3ar | 4al | 4ar | 5al | 5ar |
| 3bl | 3br | 4bl | 4br | 5bl | 5br |
| 6al | 6ar | 7al | 7ar | 8al | 8ar |
| 6bl | 6br | 7bl | 7br | 8bl | 8br |

FIG. 9

| 0 | 1 | 2 |
|---|---|---|
| 3 | 4 | 5 |
| 6 | 7 | 8 |

FIG. 10

| 0l | 0r | 1l | 1r | 2l | 2r |
|----|----|----|----|----|----|
| 3l | 3r | 4l | 4r | 5l | 5r |
| 6l | 6r | 7l | 7r | 8l | 8r |

| 0a | 1a | 2a |
|----|----|----|
| 0b | 1b | 2b |
| 3a | 4a | 5a |
| 3b | 4b | 5b |
| 6a | 7a | 8a |
| 6b | 7b | 8b |

IMAGE PROCESSING METHOD AND IMAGE PROCESSOR

BACKGROUND OF THE INVENTION

1. Field of the Invention

The present invention relates to image processing methods and image processors, and, in particular, to an image processing method and an image processor adapted to perform resolution conversion whereby the size of an image at least in one of the horizontal and vertical directions is enlarged on a frame by frame basis.

2. Description of the Related Art

Recently, display devices are available in increasingly larger sizes and provided with capabilities for increasingly higher definition. Associated with this, it is desired that image content be made available in higher definition. Naturally, high-definition images are used to create content from scratch, but there is also a growing demand for a solution to enjoy existent non-high-definition content in a high resolution mode.

An increasing number of television sets currently available are designed to increase the pixel count of non-high-definition content to suit the high-definition panel by using interpolation techniques but no successful attempts have been made to increase the resolution in the true sense.

Attempts to generate high-resolution images from low-resolution images have been made in the past. Extensive study has been made of methods to generate high-resolution images by integrating low-resolution images having frame-to-frame positional displacements. Methods to create high-definition moving images from low-resolution moving images have also been studied widely.

We also proposed in patent document 1 a method that complies with Maximum A Posteriori (MAP) estimation and enables high-speed processing. The method meets two conditions, namely, (1) a high-resolution image is reduced to a low-resolution image by calculating an average of four pixels and (2) the pixel values of an enlarged image meet the Markov property (individual attribute values depend only on attribute values in the immediate neighborhood).

[patent document 1] JP5327176

Many of the high-resolution techniques according to the related art, including the method of patent document 1, do not generally address ringing that occurs in the process of generating pixel values. For this reason, distortion such as a pseudo contour may be produced at, for example, a steep peripheral edge or the waveform characteristics of step-wise variation in pixel values may be deteriorated. There is room for further improvement in these areas.

The ringing problem also occurs in the SBC mode and the AB mode of stereoscopic content mentioned in patent document 1. Therefore, further improvement is called for.

SUMMARY OF THE INVENTION

The present invention addresses this issue and a purpose thereof is to provide an image processing method and an image processing device adapted for image enlargement such as that of patent document 1 characterized by low computation cost and capability to secure the Markov property to a certain degree, and enabled for reducing ringing significantly and obtaining a high-quality image by adjusting the range of generated values to be within the range of pixel values in the neighborhood.

The image processing method according to an embodiment of the present invention comprises: calculating a first pixel difference sum of three differences identified between a pixel value of a pixel of interest subject to a process in an input image and pixel values of three pixels to the upper left of, to the left of, and above the pixel of interest; calculating a second pixel difference sum of three differences identified between the pixel value of the pixel of interest subject to the process in the input image and pixel values of three pixels to the upper right of, above, and to the right of the pixel of interest; calculating a third pixel difference sum of three differences identified between the pixel value of the pixel of interest subject to the process in the input image and pixel values of three pixels to the lower left of, to the left of, and below the pixel of interest; calculating a fourth pixel difference sum of three differences identified between the pixel value of the pixel of interest subject to the process in the input image and pixel values of three pixels to the lower right of, to the right of, and below the pixel of interest; calculating an average value of the first through fourth pixel difference sums; calculating a first deviation by subtracting the average value from the first pixel difference sum, a second deviation by subtracting the average value from the second pixel difference sum, a third deviation by subtracting the average value from the third pixel difference sum, and a fourth deviation by subtracting the average value from the fourth pixel difference sum; determining first through fourth adjusted deviations by respectively multiplying the first through fourth deviations by a constant; performing a candidate coefficient calculation of: determining an upper limit value and a lower limit value based on the maximum value and minimum value of the pixel values of the pixel of interest subject to the process and adjacent pixels in the input image; calculating a fifth deviation by subtracting the pixel value of the pixel of interest subject to the process in the input image from the upper limit value and a sixth deviation by subtracting the pixel value of the pixel of interest subject to the process in the input image from the lower limit value; when the first adjusted deviation is positive and larger than the fifth deviation, determining A0 resulting from dividing the fifth deviation by the first adjusted deviation as a candidate of coefficient; when the first adjusted deviation is negative and smaller than the sixth deviation, determining B0 resulting from dividing the sixth deviation by the first adjusted deviation as a candidate of coefficient; when the second adjusted deviation is positive and larger than the fifth deviation, determining A1 resulting from dividing the fifth deviation by the second adjusted deviation as a candidate of coefficient; when the second adjusted deviation is negative and smaller than the sixth deviation, determining B1 resulting from dividing the sixth deviation by the second adjusted deviation as a candidate of coefficient; when the third adjusted deviation is positive and larger than the fifth deviation, determining A2 resulting from dividing the fifth deviation by the third adjusted deviation as a candidate of coefficient; when the third adjusted deviation is negative and smaller than the sixth deviation, determining B2 resulting from dividing the sixth deviation by the third adjusted deviation as a candidate of coefficient; when the fourth adjusted deviation is positive and larger than the fifth deviation, determining A3 resulting from dividing the fifth deviation by the fourth adjusted deviation as a candidate of coefficient; and when the fourth adjusted deviation is negative and smaller than the sixth deviation, determining B3 resulting from dividing the sixth deviation by the fourth adjusted deviation as a candidate of coefficient, deriving the minimum of the candidates of coefficient A0-A3 and B0-B3 as the minimum coefficient; subtracting a value derived from multiplying the first adjusted deviation by the minimum coefficient from the pixel value of the pixel of interest subject to the process in the input image, thereby obtaining a pixel value of a top left pixel of four pixels, in an enlarged image twice the size of the input image both in horizontal and vertical directions, located at positions corresponding to the pixel of interest and having the same size as the pixel of interest; subtracting a value derived from multiplying the second adjusted deviation by the minimum coefficient from the pixel value of the pixel of interest subject to the process in the input image, thereby obtaining a pixel value of a top right pixel of the four pixels in the enlarged image; subtracting a value derived from multiplying the third adjusted deviation by the minimum coefficient from the pixel value of the pixel of interest subject to the process in the input image, thereby obtaining a pixel value of a bottom left pixel of the four pixels in the enlarged image; and subtracting a value derived from multiplying the fourth adjusted deviation by the minimum coefficient from the pixel value of the pixel of interest subject to the process in the input image, thereby obtaining a pixel value of a bottom right pixel of the four pixels in the enlarged image.

Another embodiment of the present invention relates to an image processing method. The method comprises: calculating a first pixel difference sum of five differences identified between a pixel value of a pixel of interest subject to a process in an input image and pixel values of five pixels to the upper left of, to the left of, above, to the lower left of, and below the pixel of interest, the input image including compressed stereoscopic images obtained by compressing a pair of stereoscopic images to ½ an original size in a horizontal direction and arranged in a horizontal direction to build one image; calculating a second pixel difference sum of five differences identified between the pixel value of the pixel of interest subject to the process in the input image and pixel values of five pixels to the upper right of, above, to the right of, to the lower right of, and below the pixel of interest; calculating an average value of the first and second pixel difference sums; calculating a first deviation by subtracting the average value from the first pixel difference sum and a second deviation by subtracting the average value from the second pixel difference sum; determining first and second adjusted deviations by respectively multiplying the first and second deviations by a constant; performing a candidate coefficient calculation of: determining an upper limit value and a lower limit value based on the maximum value and minimum value of the pixel values of the pixel of interest subject to the process and adjacent pixels in the input image; calculating a third deviation by subtracting the pixel value of the pixel of interest subject to the process in the input image from the upper limit value and a fourth deviation by subtracting the pixel value of the pixel of interest subject to the process in the input image from the lower limit value; when the first adjusted deviation is positive and larger than the third deviation, determining A0 resulting from dividing the third deviation by the first adjusted deviation as a candidate of coefficient; when the first adjusted deviation is negative and smaller than the fourth deviation, determining B0 resulting from dividing the fourth deviation by the first adjusted deviation as a candidate of coefficient; when the second adjusted deviation is positive and larger than the third deviation, determining A1 resulting from dividing the third deviation by the second adjusted deviation as a candidate of coefficient; and when the second adjusted deviation is negative and smaller than the fourth deviation, determining B1 resulting from dividing the fourth deviation by the second adjusted deviation as a candidate of coefficient, deriving the minimum of the candidates of coefficient A0, A1, B0, and B1 as the minimum coefficient; performing a first calculation of subtracting a value derived from multiplying the first adjusted deviation by the minimum coefficient from the pixel value of the pixel of interest subject to the process in the input image, thereby obtaining a pixel value of a left pixel of two pixels, in an enlarged image twice the size of the input image in a horizontal direction, located at positions corresponding to the pixel of interest and having the same size as the pixel of interest; performing a second calculation of subtracting a value derived from multiplying the second adjusted deviation by the minimum coefficient from the pixel value of the pixel of interest subject to the process in the input image, thereby obtaining a pixel value of a right pixel of the two pixels in the enlarged image; and separating the enlarged image obtained by the first and second calculations into left and right images and outputting the pair of stereoscopic images separately.

Another embodiment of the present invention also relates to an image processing method. The method comprises: calculating a first pixel difference sum of five differences identified between a pixel value of a pixel of interest subject to a process in an input image and pixel values of five pixels to the upper left of, above, to the upper right of, to the left of, and to the right of the pixel of interest, the input image including compressed stereoscopic images obtained by compressing a pair of stereoscopic images to ½ an original size in a vertical direction and arranged in a vertical direction to build one image; calculating a second pixel difference sum of five differences identified between the pixel value of the pixel of interest subject to the process in the input image and pixel values of five pixels to the lower left of, below, to the lower right of, to the left of, and to the right of the pixel of interest; calculating an average value of the first and second pixel difference sums; calculating a first deviation by subtracting the average value from the first pixel difference sum and a second deviation by subtracting the average value from the second pixel difference sum; determining first and second adjusted deviations by respectively multiplying the first and second deviations by a constant; performing a candidate coefficient calculation of: determining an upper limit value and a lower limit value based on the maximum value and minimum value of the pixel values of the pixel of interest subject to the process and adjacent pixels in the input image; calculating a third deviation by subtracting the pixel value of the pixel of interest subject to the process in the input image from the upper limit value and a fourth deviation by subtracting the pixel value of the pixel of interest subject to the process in the input image from the lower limit value; when the first adjusted deviation is positive and larger than the third deviation, determining A0 resulting from dividing the third deviation by the first adjusted deviation as a candidate of coefficient; when the first adjusted deviation is negative and smaller than the fourth deviation, determining B0 resulting from dividing the fourth deviation by the first adjusted deviation as a candidate of coefficient; when the second adjusted deviation is positive and larger than the third deviation, determining A1 resulting from dividing the third deviation by the second adjusted deviation as a candidate of coefficient; and when the second adjusted deviation is negative and smaller than the fourth deviation, determining B1 resulting from dividing the fourth deviation by the second adjusted deviation as a candidate of coefficient, deriving the minimum of the candidates of coefficient A0, A1, B0, and B1 as the minimum coefficient; performing a first calculation of subtracting a value derived from multiplying the first adjusted deviation by the minimum coefficient from the pixel value of the pixel of interest subject to the process in the input image, thereby obtaining a pixel value of a top pixel of two pixels, in an enlarged image twice the size of the input image in a vertical direction, located at positions corresponding to the pixel of interest and having the same size as the pixel of interest; performing a second calculation of subtracting a value derived from multiplying the second adjusted deviation by the minimum coefficient from the pixel value of the pixel of interest subject to the process in the input image, thereby obtaining a pixel value of a bottom pixel of the two pixels in the enlarged image; and separating the enlarged image obtained by the first and second calculations into top and bottom images and outputting the pair of stereoscopic images separately.

Another embodiment of the present invention relates to an image processor. The image processor comprises: a first pixel difference sum calculator that calculates a first pixel difference sum of three differences identified between a pixel value of a pixel of interest subject to a process in an input image and pixel values of three pixels to the upper left of, to the left of, and above the pixel of interest; a second pixel difference sum calculator that calculates a second pixel difference sum of three differences identified between the pixel value of the pixel of interest subject to the process in the input image and pixel values of three pixels to the upper right of, above, and to the right of the pixel of interest; a third pixel difference sum calculator that calculates a third pixel difference sum of three differences identified between the pixel value of the pixel of interest subject to the process in the input image and pixel values of three pixels to the lower left of, to the left of, and below the pixel of interest; a fourth pixel difference sum calculator that calculates a fourth pixel difference sum of three differences identified between the pixel value of the pixel of interest subject to the process in the input image and pixel values of three pixels to the lower right of, to the right of, and below the pixel of interest; an average value calculator that calculates an average value of the first through fourth pixel difference sums; a deviation calculator that calculates a first deviation by subtracting the average value from the first pixel difference sum, a second deviation by subtracting the average value from the second pixel difference sum, a third deviation by subtracting the average value from the third pixel difference sum, and a fourth deviation by subtracting the average value from the fourth pixel difference sum; an adjusted deviation calculator that determines first through fourth adjusted deviations by respectively multiplying the first through fourth deviations by a constant; a candidate coefficient calculator that: determines an upper limit value and a lower limit value based on the maximum value and minimum value of the pixel values of the pixel of interest subject to the process and adjacent pixels in the input image; calculates a fifth deviation by subtracting the pixel value of the pixel of interest subject to the process in the input image from the upper limit value and a sixth deviation by subtracting the pixel value of the pixel of interest subject to the process in the input image from the lower limit value; when the first adjusted deviation is positive and larger than the fifth deviation, determines A0 resulting from dividing the fifth deviation by the first adjusted deviation as a candidate of coefficient; when the first adjusted deviation is negative and smaller than the sixth deviation, determines B0 resulting from dividing the sixth deviation by the first adjusted deviation as a candidate of coefficient; when the second adjusted deviation is positive and larger than the fifth deviation, determines A1 resulting from dividing the fifth deviation by the second adjusted deviation as a candidate of coefficient; when the second adjusted deviation is negative and smaller than the sixth deviation, determines B1 resulting from dividing the sixth deviation by the second adjusted deviation as a candidate of coefficient; when the third adjusted deviation is positive and larger than the fifth deviation, determines A2 resulting from dividing the fifth deviation by the third adjusted deviation as a candidate of coefficient; when the third adjusted deviation is negative and smaller than the sixth deviation, determines B2 resulting from dividing the sixth deviation by the third adjusted deviation as a candidate of coefficient; when the fourth adjusted deviation is positive and larger than the fifth deviation, determines A3 resulting from dividing the fifth deviation by the fourth adjusted deviation as a candidate of coefficient; and when the fourth adjusted deviation is negative and smaller than the sixth deviation, determines B3 resulting from dividing the sixth deviation by the fourth adjusted deviation as a candidate of coefficient, a minimum coefficient derivation unit that derives the minimum of the candidates of coefficient A0-A3 and B0-B3 as the minimum coefficient; a first calculator that subtracts a value derived from multiplying the first adjusted deviation by the minimum coefficient from the pixel value of the pixel of interest subject to the process in the input image, thereby obtaining a pixel value of a top left pixel of four pixels, in an enlarged image twice the size of the input image both in horizontal and vertical directions, located at positions corresponding to the pixel of interest and having the same size as the pixel of interest; a second calculator that subtracts a value derived from multiplying the second adjusted deviation by the minimum coefficient from the pixel value of the pixel of interest subject to the process in the input image, thereby obtaining a pixel value of a top right pixel of the four pixels in the enlarged image; a third calculator that subtracts a value derived from multiplying the third adjusted deviation by the minimum coefficient from the pixel value of the pixel of interest subject to the process in the input image, thereby obtaining a pixel value of a bottom left pixel of the four pixels in the enlarged image; and a fourth calculator that subtracts a value derived from multiplying the fourth adjusted deviation by the minimum coefficient from the pixel value of the pixel of interest subject to the process in the input image, thereby obtaining a pixel value of a bottom right pixel of the four pixels in the enlarged image.

Another embodiment of the present invention also relates to an image processor. The image processor comprises: a first pixel difference sum calculator that calculates a first pixel difference sum of five differences identified between a pixel value of a pixel of interest subject to a process in an input image and pixel values of five pixels to the upper left of, to the left of, above, to the lower left of, and below the pixel of interest, the input image including compressed stereoscopic images obtained by compressing a pair of stereoscopic images to ½ an original size in a horizontal direction and arranged in a horizontal direction to build one image; a second pixel difference sum calculator that calculates a second pixel difference sum of five differences identified between the pixel value of the pixel of interest subject to the process in the input image and pixel values of five pixels to the upper right of, above, to the right of, to the lower right of, and below the pixel of interest; an average value calculator that calculates an average value of the first and second pixel difference sums; a deviation calculator that calculates a first deviation by subtracting the average value from the first pixel difference sum and a second deviation by subtracting the average value from the second pixel difference sum; an adjusted deviation calculator that determines first and second adjusted deviations by respectively multiplying the first and second deviations by a constant; a candidate coefficient calculator that: determines an upper limit value and a lower limit value based on the maximum value and minimum value of the pixel values of the pixel of interest subject to the process and adjacent pixels in the input image; calculates a third deviation by subtracting the pixel value of the pixel of interest subject to the process in the input image from the upper limit value and a fourth deviation by subtracting the pixel value of the pixel of interest subject to the process in the input image from the lower limit value; when the first adjusted deviation is positive and larger than the third deviation, determines A0 resulting from dividing the third deviation by the first adjusted deviation as a candidate of coefficient; when the first adjusted deviation is negative and smaller than the fourth deviation, determines B0 resulting from dividing the fourth deviation by the first adjusted deviation as a candidate of coefficient; when the second adjusted deviation is positive and larger than the third deviation, determines A1 resulting from dividing the third deviation by the second adjusted deviation as a candidate of coefficient; and when the second adjusted deviation is negative and smaller than the fourth deviation, determines B1 resulting from dividing the fourth deviation by the second adjusted deviation as a candidate of coefficient, a minimum coefficient derivation unit that derives the minimum of the candidates of coefficient A0, A1, B0, and B1 as the minimum coefficient; a first calculator that subtracts a value derived from multiplying the first adjusted deviation by the minimum coefficient from the pixel value of the pixel of interest subject to the process in the input image, thereby obtaining a pixel value of a left pixel of two pixels, in an enlarged image twice the size of the input image in a horizontal direction, located at positions corresponding to the pixel of interest and having the same size as the pixel of interest; a second calculator that subtracts a value derived from multiplying the second adjusted deviation by the minimum coefficient from the pixel value of the pixel of interest subject to the process in the input image, thereby obtaining a pixel value of a right pixel of the two pixels in the enlarged image; and a left-right separator that separates the enlarged image obtained by the first and second calculators into left and right images and outputs the pair of stereoscopic images separately.

Another embodiment of the present invention also relates to an image processor. The image processor comprises: a first pixel difference sum calculator that calculates a first pixel difference sum of five differences identified between a pixel value of a pixel of interest subject to a process in an input image and pixel values of five pixels to the upper left of, above, to the upper right of, to the left of, and to the right of the pixel of interest, the input image including compressed stereoscopic images obtained by compressing a pair of stereoscopic images to ½ an original size in a vertical direction and arranged in a vertical direction to build one image; a second pixel difference sum calculator that calculates a second pixel difference sum of five differences identified between the pixel value of the pixel of interest subject to the process in the input image and pixel values of five pixels to the lower left of, below, to the lower right of, to the left of, and to the right of the pixel of interest; an average value calculator that calculates an average value of the first and second pixel difference sums; a deviation calculator that calculates a first deviation by subtracting the average value from the first pixel difference sum and a second deviation by subtracting the average value from the second pixel difference sum; an adjusted deviation calculator that determines first and second adjusted deviations by respectively multiplying the first and second deviations by a constant; a candidate coefficient calculator that: determines an upper limit value and a lower limit value based on the maximum value and minimum value of the pixel values of the pixel of interest subject to the process and adjacent pixels in the input image; calculates a third deviation by subtracting the pixel value of the pixel of interest subject to the process in the input image from the upper limit value and a fourth deviation by subtracting the pixel value of the pixel of interest subject to the process in the input image from the lower limit value; when the first adjusted deviation is positive and larger than the third deviation, determines A0 resulting from dividing the third deviation by the first adjusted deviation as a candidate of coefficient; when the first adjusted deviation is negative and smaller than the fourth deviation, determines B0 resulting from dividing the fourth deviation by the first adjusted deviation as a candidate of coefficient; when the second adjusted deviation is positive and larger than the third deviation, determines A1 resulting from dividing the third deviation by the second adjusted deviation as a candidate of coefficient; and when the second adjusted deviation is negative and smaller than the fourth deviation, determines B1 resulting from dividing the fourth deviation by the second adjusted deviation as a candidate of coefficient, a minimum coefficient derivation unit that derives the minimum of the candidates of coefficient A0, A1, B0, and B1 as the minimum coefficient; a first calculator that subtracts a value derived from multiplying the first adjusted deviation by the minimum coefficient from the pixel value of the pixel of interest subject to the process in the input image, thereby obtaining a pixel value of a top pixel of two pixels, in an enlarged image twice the size of the input image in a vertical direction, located at positions corresponding to the pixel of interest and having the same size as the pixel of interest; a second calculator that subtracts a value derived from multiplying the second adjusted deviation by the minimum coefficient from the pixel value of the pixel of interest subject to the process in the input image, thereby obtaining a pixel value of a bottom pixel of the two pixels in the enlarged image; and a top-bottom separator that separates the enlarged image obtained by the first and second calculators into top and bottom images and outputs the pair of stereoscopic images separately.

Optional combinations of the aforementioned constituting elements, and implementations of the invention in the form of methods, apparatuses, systems, recording mediums, and computer programs may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 3 shows an array of pixels in an input image according to the first embodiment;

FIG. 4 shows an array of pixels in an enlarged image obtained according to the first embodiment of the present invention;

FIG. 9 shows an array of pixels in an input image according to the third embodiment;

FIG. 10 shows an array of pixels in an enlarged image obtained according to the second embodiment of the present invention;

DETAILED DESCRIPTION OF THE INVENTION

The invention will now be described by reference to the preferred embodiments. This does not intend to limit the scope of the present invention, but to exemplify the invention.

A description will be given of an embodiment of the present invention with reference to the drawings.

First Embodiment

Figure 1:
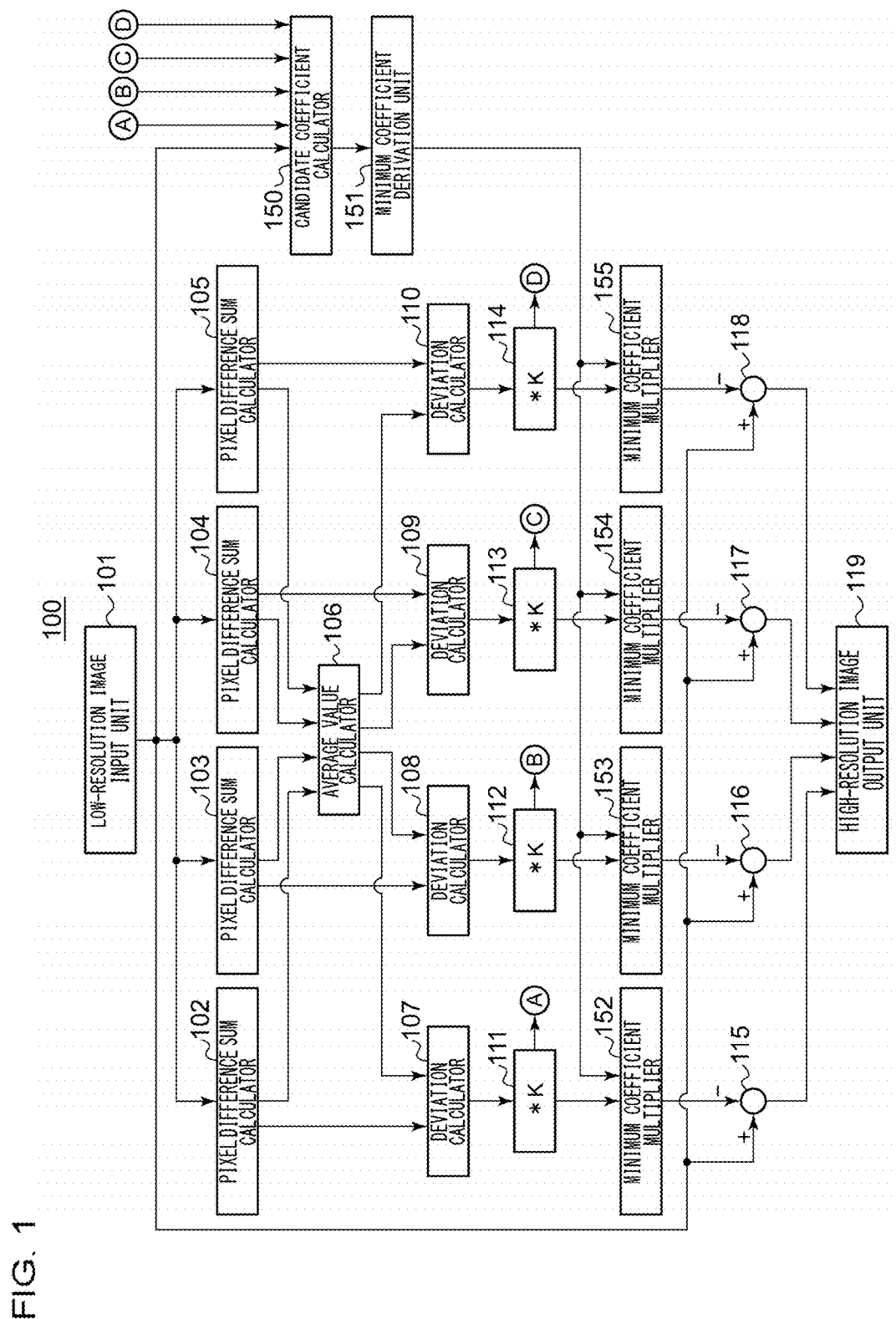
FIG. 1 is a block diagram of the image processor according to the first embodiment of the present invention.
Figure 2:
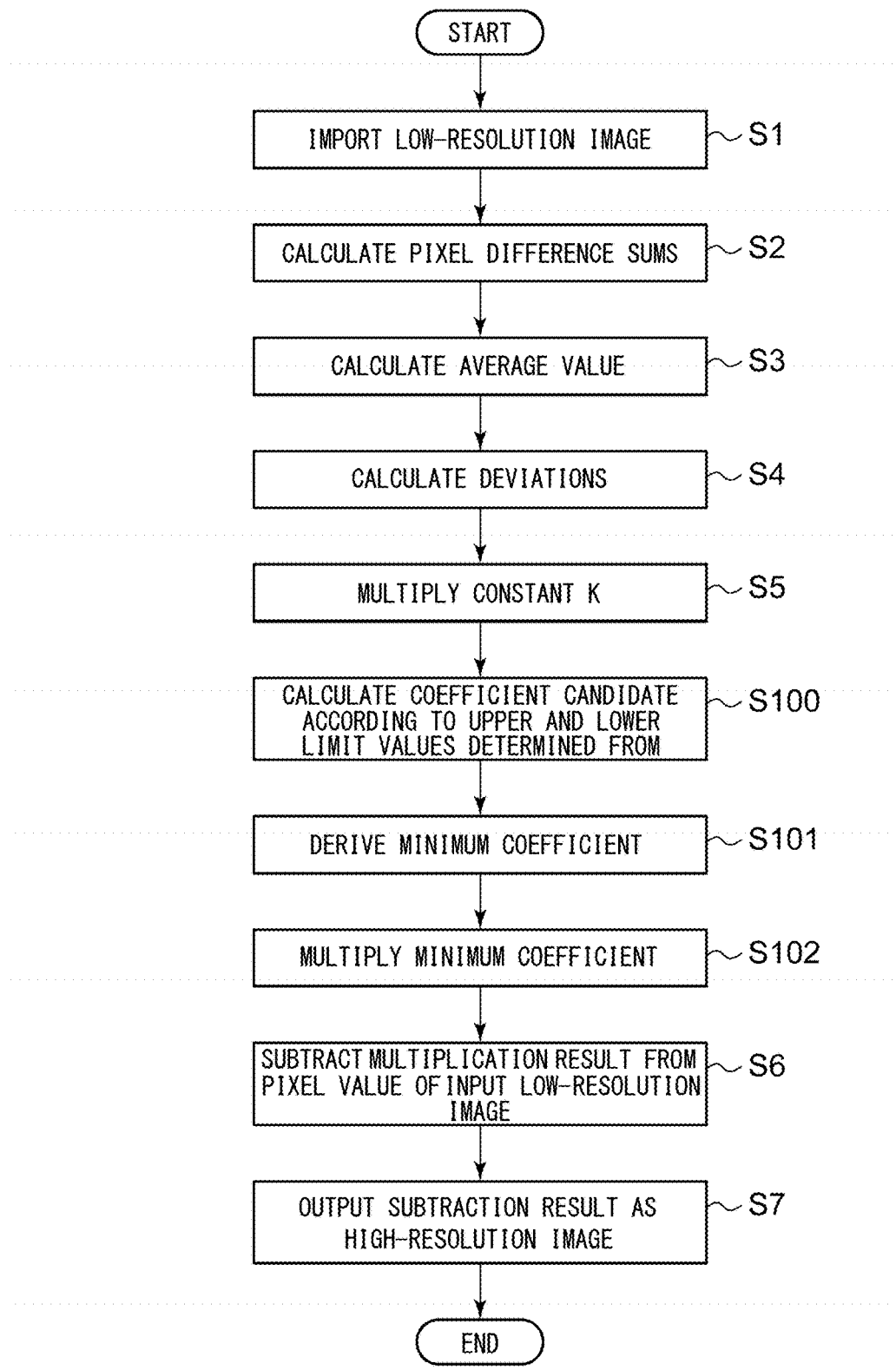
FIG. 2 is a flowchart of the image processing method according to the first embodiment of the present invention.

FIG. 1 is a block diagram of the image processor according to the first embodiment of the present invention, and FIG. 2 is a flowchart of the image processing method according to the first embodiment of the present invention.

Referring to FIG. 1 an image processor 100 according to the embodiment includes a low-resolution image input unit 101, four pixel difference sum calculators 102-105, an average value calculator 106, four deviation calculators 107-110, four multipliers (corresponding to "adjusted deviation calculators") 111-114 provided in association with the deviation calculators 107-110, a candidate coefficient calculator 150 for calculating a candidate of coefficient from the results of calculation by the multipliers 111-114 and pixel values in the neighborhood of the input pixel, a minimum coefficient derivation unit 151 for deriving the minimum value from the result of calculation by the candidate coefficient calculator 150, minimum coefficient multipliers 152-155 for multiplying the result of derivation by the minimum coefficient derivation unit 151 by the outputs from the multipliers 111-114, four subtractors 115-118 provided in association with the minimum coefficient multipliers 152-155, and a high-resolution image output unit 119 for synthesizing the signals output from the subtractors 115-118 and outputs the synthesized signal as a high-resolution image. The combination of the minimum coefficient multipliers 152-155 and the subtractors 115-118 corresponds to "the first through fourth calculators."

The low-resolution image input to and imported by the low-resolution image input unit 101 is an image of pre-processed resolution. It will be assumed that the image processor 100 according to the embodiment performs an image process to obtain a 200%-sized high-resolution image from the low-resolution image. The following description assumes that the luminance is subject to the image process. The image process can also be applied to color difference or to primary colors. Given that the pixel of interest in the input low-resolution image subject to the process is indicated by "4" in FIG. 3, the image processor 100 according to the embodiment performs an image process to produce a high-resolution image by using a total of 8 pixels indicated by "0"-"3," "5"-"8" surrounding the pixel of interest in an array of 3×3 pixels.

The pixel difference sum calculators 102-105 calculate the sum of differences between the pixel value of the pixel of interest and the pixel values (or the value obtained by multiplying the pixel values by a constant) of predetermined surrounding pixels. The average value calculator 106 calculates the average value of the four pixel difference sums output from the pixel difference sum calculators 102-105. The deviation calculators 107-110 calculate the deviations defined as differences between the pixel difference sums from the pixel difference sum calculators 102-105 provided in association with the deviation calculators 107-110 and the average value output from the average value calculator 106. The multipliers 111-114 multiply the deviations output from the deviation calculators 107-110 provided in association with the multipliers 111-114 by a constant K. The candidate coefficient calculator 150 calculates a candidate of coefficient used in the succeeding stage, using the results of multiplication by the multipliers 111-114 and the pixel values of "0"-"8." The minimum coefficient derivation unit 151 derives the minimum value from the result of calculation by the candidate coefficient calculator 150. The minimum coefficient multipliers 152-155 multiply the result of derivation by the minimum coefficient derivation unit 151 by the outputs from the multipliers 111-114. The subtractors 115-118 subtract the results of multiplication output from the minimum coefficient multipliers 152-155 provided in association with the subtractors 115-118 from the pixel value of the low-resolution image input to the low-resolution image input unit 101 and output the pixel values of the pixels to the upper left, upper right, lower left, and lower right of the pixel of interest in the enlarged image.

The operation of the image processor 100 according to the embodiment will be described below with reference to the flowchart of FIG. 2.

First, the low-resolution image input unit 101 imports a low-resolution image (pre-processing image) (step S1). Subsequently, the pixel difference sum calculators 102-105 calculate the pixel difference sums in the low-resolution image output from the low-resolution image input unit 101 (step S2). The pixel difference sum calculator 102 calculates the sum (referred to as "sub0") of the difference (or the value obtained by multiplying the difference by a constant) between the pixel value (hereinafter, referred to as yl[4]) of the pixel of interest "4" in the input low-resolution image subject to the process and shown in FIG. 3 and the pixel value (hereinafter, referred to as yl[0]) of the pixel "0" to the upper left of the pixel of interest, the difference between yl[4] and the pixel value (hereinafter, referred to as yl[3]) of the pixel "3" to the left of the pixel of interest, and the difference between yl[4] and the pixel value (hereinafter, referred to as yl[1]) of the pixel "1" above the pixel of interest.

The pixel difference sum calculator 103 calculates the sum (referred to as "sub1") of the difference (or the value obtained by multiplying the difference by a constant) between yl[4] and the pixel value (hereinafter, referred to as yl[2]) of the pixel "2" to the upper right of the pixel of interest, the difference between yl[4] and yl[1], and the difference between yl[4] and the pixel value (hereinafter, referred to as yl[5]) of the pixel "5" to the right of the pixel of interest.

The pixel difference sum calculator 104 calculates the sum (referred to as "sub2") of the difference (or the value obtained by multiplying the difference by a constant) between yl[4] and the pixel value (hereinafter, referred to as yl[6]) of the pixel "6" to the lower left of the pixel of interest, the difference between yl[4] and yl[3], and the difference between yl[4] and the pixel value (hereinafter, referred to as yl[7]) of the pixel "7" below the pixel of interest.

The pixel difference sum calculator 105 calculates the sum (referred to as "sub3") of the difference (or the value obtained by multiplying the difference by a constant) between yl[4] and the pixel value (hereinafter, referred to as yl[8]) of the pixel "8" to the lower right of the pixel of interest, the difference between yl[4] and yl[5], and the difference between yl[4] and the pixel value (hereinafter, referred to as yl[7]) of the pixel "7" below the pixel of interest. Therefore, the pixel difference sums sub0-sub3, which are results of calculation by the pixel difference sum calculators 104-105, are given by the following expressions (the predetermined constant indicated above is "0.7").

$$\text{sub0}=0.7\times(yl[4]-yl[0])+(yl[4]-yl[1])+(yl[4]-yl[3]) \quad (1)$$

$$\text{sub1}=0.7\times(yl[4]-yl[2])+(yl[4]-yl[1])+(yl[4]-yl[5]) \quad (2)$$

$$\text{sub2}=0.7\times(yl[4]-yl[6])+(yl[4]-yl[3])+(yl[4]-yl[7]) \quad (3)$$

$$\text{sub3}=0.7\times(yl[4]-yl[8])+(yl[4]-yl[5])+(yl[4]-yl[7]) \quad (4)$$

The pixel difference sums sub0-sub3 represent the evaluation of differences of the pixel value yl[4] of the pixel of interest from the pixel values of the group of pixels to the upper left, upper right, lower left, and lower right, respectively. By reflecting the pixel difference sums sub0-sub3 in the high-resolution image in subsequent steps such that the differences are minimized, smoothness of variation in pixel values is increased and the Markov property is secured to a certain degree. The difference between the pixel value of the pixel of interest and the pixel value of the pixel diagonally adjacent to the pixel of interest is multiplied by a constant (exemplified by "0.7" in this case) in order to correct the impact from larger physical pixel-to-pixel distances between the pixel of interest and the diagonally adjacent pixels than the distances between the pixel of interest and the pixels vertically and horizontally adjacent to the pixel of interest. The values of pixel difference sums sub0-sub3 are positive, negative, or 0.

Subsequently, the average value calculator 106 calculates the average value (hereinafter, referred to as "ave") of the pixel difference sums sub0-sub3 according to the expression below (step S3).

$$\text{ave}=(\text{sub0}+\text{sub1}+\text{sub2}+\text{sub3})/4 \quad (5)$$

Subsequently, the deviation calculators 107-110 calculate the differences between the pixel difference sums sub0-sub3 calculated by the pixel difference sum calculators 102-105 provided in association with the deviation calculators 107-110 and the average value ave calculated by the average value calculator 106 (step S4). Therefore, the deviation adj0 calculated by the deviation calculator 107, the deviation adj1 calculated by the deviation calculator 108, the deviation adj2 calculated by the deviation calculator 109, and the deviation adj3 calculated by the deviation calculator 110 are given by the following expressions, respectively.

$$\text{adj0}=\text{sub0}-\text{ave} \quad (6)$$

$$\text{adj1}=\text{sub1}-\text{ave} \quad (7)$$

$$\text{adj2}=\text{sub2}-\text{ave} \quad (8)$$

$$\text{adj3}=\text{sub3}-\text{ave} \quad (9)$$

Subsequently, the multipliers 111, 112, 113, and 114 multiply the deviations adj0, adj1, adj2, and adj3 calculated by the deviation calculators 107, 108, 109, and 110, provided in association with the multipliers 111, 1112, 113, and 114, by a constant K (step S5). The constant K is defined in accordance with an actual image. For example, the constant is in a range of about 0.01-0.1.

Denoting the maximum value of yl[0]-yl[8] as MAX and the minimum value as MIN, the candidate coefficient calculator 150 calculates A0-A3 and B0-B3 as follows (step S100).

When $K*\text{adj0}>\text{MAX}-yl[4]$, $$A0=(\text{MAX}-yl[4])/(K*\text{adj0}) \quad (40)$$

When $K*\text{adj0}<0$ and $K*\text{adj0}<\text{MIN}-yl[4]$, $$B0=(\text{MIN}-yl[4])/(K*\text{adj0}) \quad (41)$$

When $K*\text{adj1}>\text{MAX}-yl[4]$, $$A1=(\text{MAX}-yl[4])/(K*\text{adj1}) \quad (42)$$

When $K*\text{adj1}<0$ and $K*\text{adj1}<\text{MIN}-yl[4]$, $$B1=(\text{MIN}-yl[4])/(K*\text{adj1}) \quad (43)$$

When $K*\text{adj2}>\text{MAX}-yl[4]$, $$A2=(\text{MAX}-yl[4])/(K*\text{adj2}) \quad (44)$$

When $K*\text{adj2}<0$ and $\text{adj2}<\text{MIN}-yl[4]$, $$B2=(\text{MIN}-yl[4])/(K*\text{adj2}) \quad (45)$$

When $K*\text{adj3}>\text{MAX}-yl[4]$, $$A3=(\text{MAX}-yl[4])/(K*\text{adj3}) \quad (46)$$

When $K*\text{adj3}<0$ and $K*\text{adj3}<\text{MIN}-yl[4]$, $$B3=(\text{MIN}-yl[4])/(K*\text{adj3}) \quad (47)$$

The minimum coefficient derivation unit 151 derives the minimum value from A0-A3 and B0-B3 (step S101). If the minimum value is greater than 1, the minimum coefficient derivation unit 151 outputs 1. The minimum coefficient will be defined as cfe.

The minimum coefficient multipliers 152-155 multiply the result of derivation by the minimum coefficient derivation unit 151 by the outputs from the multipliers 111-114 (step S102).

Subsequently, the subtractors 115-118 subtract the results of multiplication by the minimum coefficient multipliers 152-155 provided in association with the subtractors 115-118 from the pixel value yl[4] of the pixel of interest in the low-resolution image imported by the low-resolution image input unit 101 (step S6). The four subtraction results obtained by the subtractors 115-118 indicate the pixel values (hereinafter, referred to as yh[4al], yh[4ar], yh[4bl], and yh[4br]) of the four pixels "4al," "4ar," "4bl" and "4br" in the high-resolution image obtained by respectively enlarging the horizontal and vertical sizes of the pixel of interest "4" in the low-resolution image by a factor of 2. As shown in FIG. 4, the four pixels "4al," "4ar," "4bl," and "4br" are four pixels at the center of a total 36 pixels in an array including 6 pixels vertically and 6 pixels horizontally. The pixel "4al" is the post-enlargement top left pixel, the pixel "4ar" is the post-enlargement top right pixel, the pixel "4bl" is the post-enlargement bottom left pixel, and the pixel "4br" is the post-enlargement bottom right pixel.

The pixel value yh[4al] indicated by the subtraction result output from the subtractor 115, the pixel value yh[4ar] indicated by the subtraction result output from the subtractor 116, pixel value yh[4bl] indicated by the subtraction result output from the subtractor 117, and pixel value yh[4br] indicated by the subtraction result output from the subtractor 118 are given by the following expressions, respectively.

$$yh[4al]=yl[4]-cfe*K*\text{adj}0 \tag{10}$$

$$yh[4ar]=yl[4]-cfe*K*\text{adj}1 \tag{11}$$

$$yh[4bl]=yl[4]-cfe*K*\text{adj}2 \tag{12}$$

$$yh[4br]=yl[4]-cfe*K*\text{adj}3 \tag{13}$$

The high-resolution image output unit 119 synthesizes the four subtraction results obtained by the subtractors 115-118 and outputs the synthesized results as the pixel values of the four pixels "4al," "4ar," "4bl," and "4br" shown in FIG. 4, having the same size as the pixel of interest, in the high-resolution image obtained by respectively enlarging the horizontal and vertical sizes of the pixel of interest "4" in the low-resolution image by a factor of 2 (step S7).

The total of the four deviations adj0-adj3 represents the average of deviations from the average value ave and so is equal to 0. As a result, the following equation holds.

$$(yh[4al]+yh[4ar]+yh[4bl]+yh[4br])/4=yl[4] \tag{14}$$

This means that the condition for returning the high-resolution image to the original image is secured by averaging four pixels to reduce the resolution.

Multiplication by cfe in the expressions (10)-(13) ensures that yh[4al], yh[4ar], yh[4bl], and yh[4br] are within the range (MIN-MAX) of the pixel values in the neighborhood and enables avoiding noticeable ringing.

Figure 15:
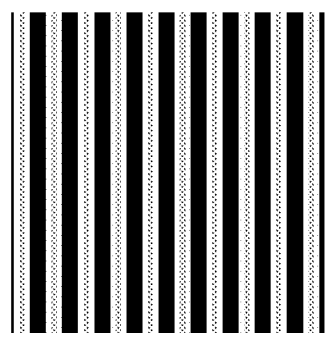
FIG. 15 is an exemplary process result according to the first embodiment disclosed in patent document 1.
Figure 16:
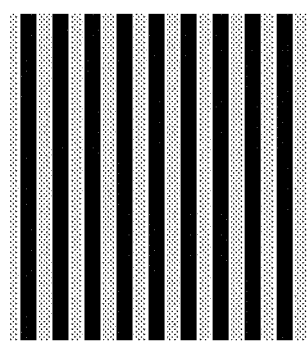
FIG. 16 is an exemplary process result according to the first embodiment of the present invention.

Thus, the embodiment is adapted for image enlargement characterized by low computation cost and capability to secure the Markov property to a certain degree, and enabled for reducing ringing significantly by adjusting the range of generated values to be within the range of pixel values in the neighborhood. FIGS. 15 and 16 are enlarged views of binary stripes according to patent document 1 and the embodiment. It will be appreciated that the process according to the embodiment yields a truly binary result.

Second Embodiment

Figure 5:
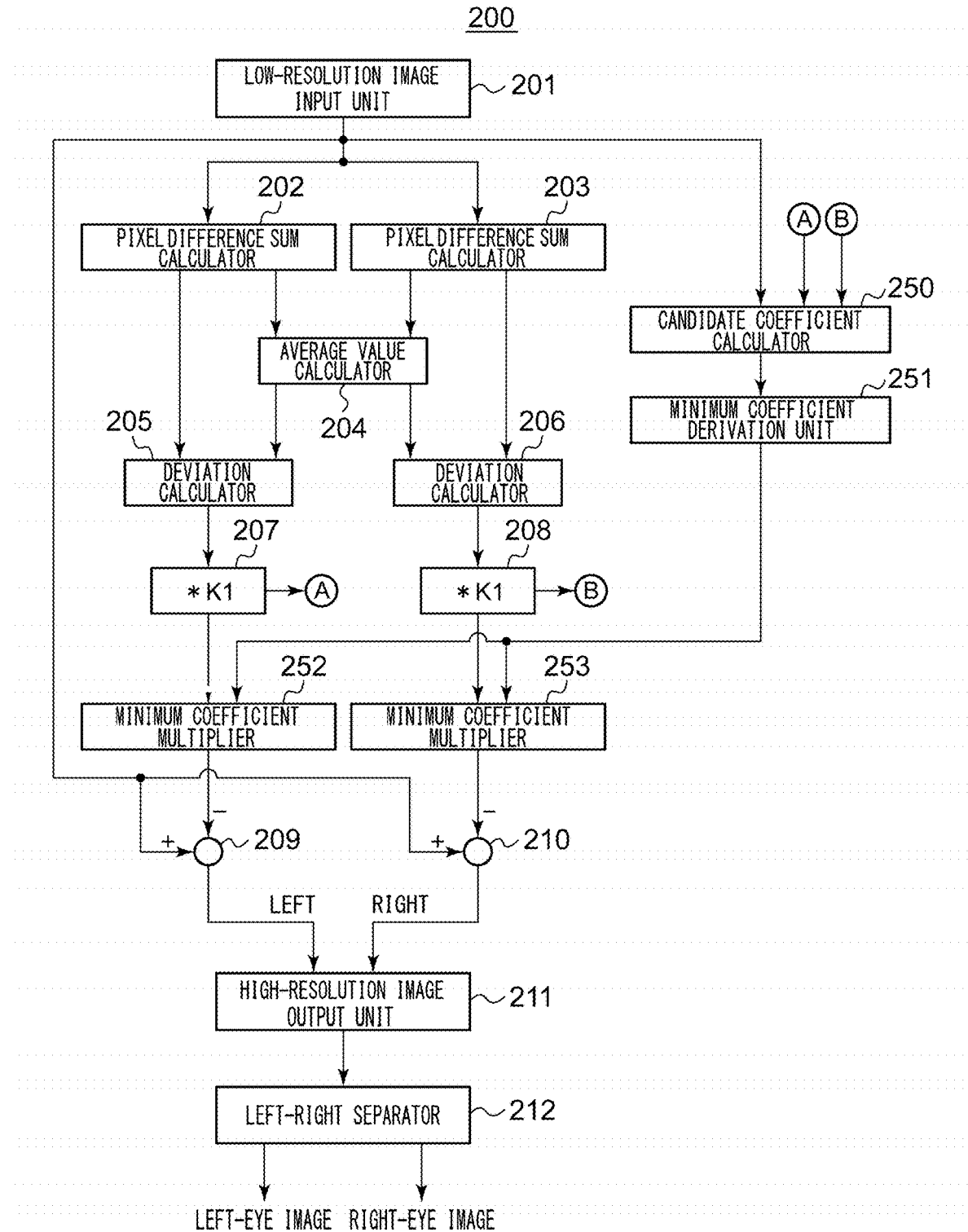
FIG. 5 is a block diagram of the image processor according to the second embodiment of the present invention.
Figure 6:
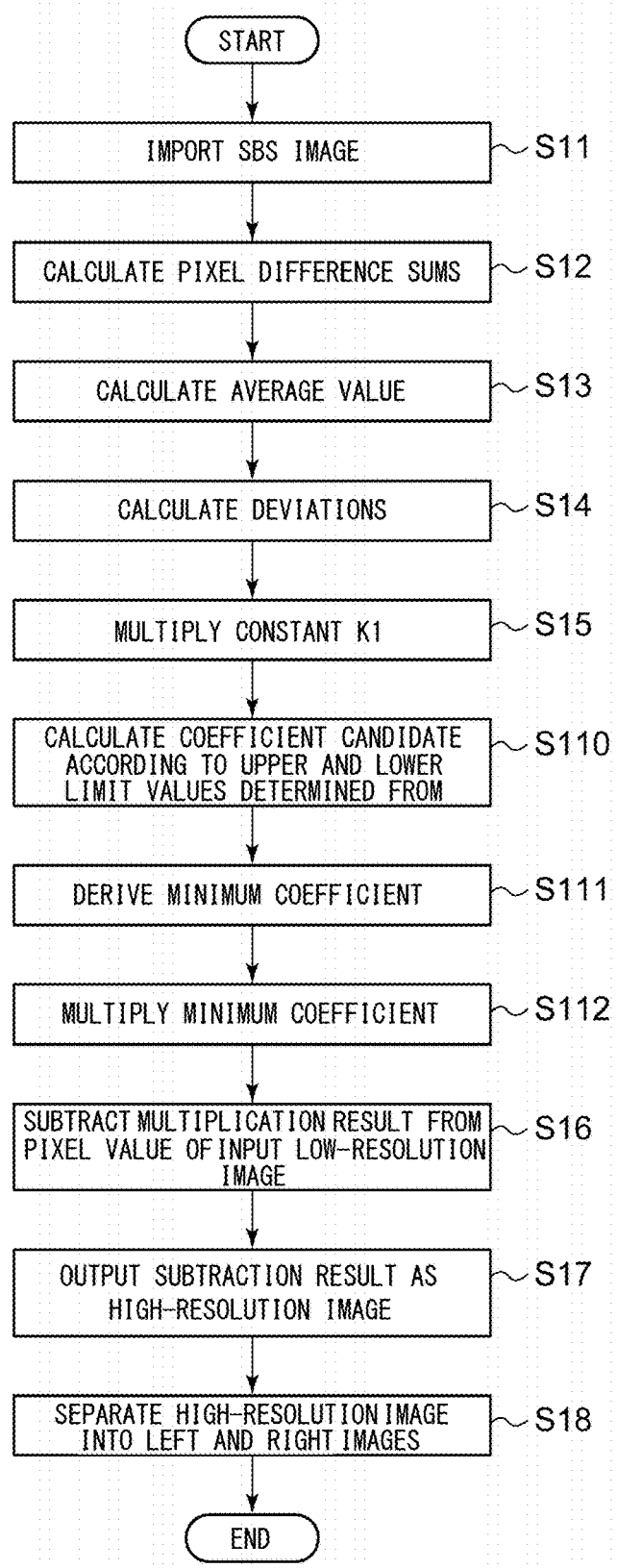
FIG. 6 is a flowchart of the image processing method according to the second embodiment of the present invention.

A description will now be given of the second embodiment of the present invention. FIG. 5 is a block diagram of the image processor according to the second embodiment of the present invention, and FIG. 6 is a flowchart of the image processing method according to the second embodiment of the present invention.

Referring to FIG. 5, an image processor 200 according to the embodiment includes a low-resolution image input unit 201, two pixel difference sum calculators 202 and 203, an average value calculator 204, two deviation calculators 205 and 206, two multipliers (corresponding to "adjusted deviation calculators") 207 and 208 provided in association with the deviation calculators 205 and 206, a candidate coefficient calculator 250 for calculating a candidate of coefficient from the results of calculation by the multipliers 207 and 208 and pixel values in the neighborhood of the input pixel, a minimum coefficient derivation unit 251 for deriving the minimum value from the result of calculation by the candidate coefficient calculator 250, minimum coefficient multipliers 252 and 253 for multiplying the result of derivation by the minimum coefficient derivation unit 251 by the outputs from the multipliers 207 and 208, two subtractors 209 and 210 provided in association with the minimum coefficient multipliers 252 and 253, a high-resolution image output unit 211 for synthesizing the signals output from the subtractors 209 and 210 and outputs the synthesized signal as a high-resolution image, and a left-right separator 212 for separating the high-resolution image into left and right images. The combination of the minimum coefficient multipliers 252, 253 and the subtractors 209, 210 corresponds to "the first and second calculators."

Figure 7:
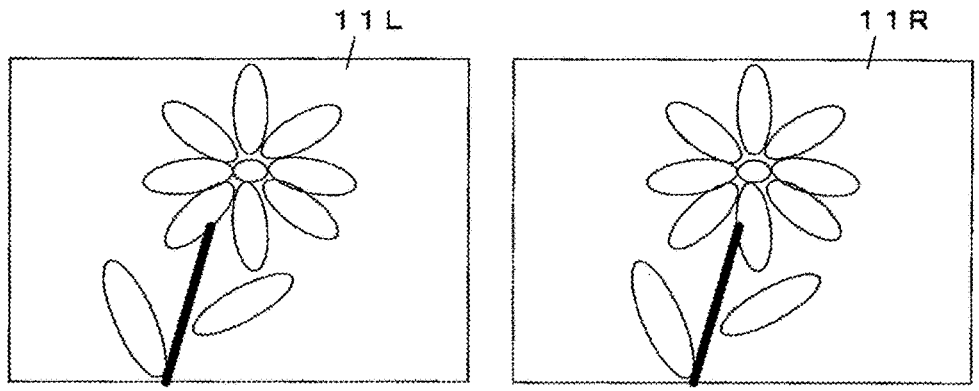
FIG. 7 shows an exemplary stereoscopic image.

The low-resolution image input to and imported by the low-resolution image input unit 201 is an image of pre-processed resolution and an image (hereinafter, SBS image) complying with the Side-By-Side (SBS) scheme. An SBS image is obtained by compressing two frames, including a left-eye image 11L for a frame and a right-eye image 11R for a frame (i.e., a pair of stereoscopic images) shown in FIG. 7, to ½ the original size in the horizontal direction and arranging a resultant compressed left-eye image 12a and a resultant compressed right-eye image 12B shown in FIG. 8 in the horizontal direction to build a frame for transmission.

It will be assumed that the image processor 200 according to the embodiment performs an image process to obtain the two stereoscopic images of the original size (the left-eye image 11L and the right-eye image 11R shown in FIG. 7) from the SBS image. The following description assumes that the luminance is subject to the image process. The image process can also be applied to color difference or to primary colors. Given that the pixel of interest in the input SBC image subject to the process is indicated by "4" in FIG. 9, the image processor 200 according to the embodiment performs an image process by using a total of 8 pixels indicated by "0"-"3," "5"-"8" surrounding the pixel of interest in an array of 3×3 pixels.

The pixel difference sum calculators 202 and 203 calculate the sum of differences between the pixel value of the pixel of interest and the pixel values (or the value obtained by multiplying the pixel values by a constant) of predetermined surrounding pixels. The average value calculator 204 calculates the average value of the two pixel difference sums output from the pixel difference sum calculators 202 and 203. The deviation calculators 205 and 206 calculate the deviations defined as differences between the pixel difference sums from the pixel difference sum calculators 202 and 203 provided in association with the deviation calculators 205 and 206 and the average value output from the average value calculator 204. The multipliers 207 and 208 multiply the deviations output from the deviation calculators 205 and 206 provided in association with the multipliers 207 and 208 by a constant K1. The candidate coefficient calculator 250 calculates a candidate of coefficient used in the succeeding stage, using the results of multiplication by the multipliers 207-208 and the pixel values of "0"-"8." The minimum coefficient derivation unit 251 derives the minimum value from the result of calculation by the candidate coefficient calculator 250. The minimum coefficient multipliers 252-253 multiply the result of derivation by the minimum coefficient derivation unit 251 by the outputs from the multipliers 207-208. The subtractors 209 and 210 subtract the results of multiplication output from the minimum coefficient multipliers 252-253 provided in association with the subtractors 209 and 210 from the pixel value of the low-resolution image input to the low-resolution image input unit 201. Each of the subtractors 209 and 210 outputs the pixel value of a pixel resulting from enlarging the image size of a frame by a factor of 2 in the horizontal direction. The left-right separator 212 separates the high-resolution image, output from the high-resolution image output unit 211 and including pixels resulting from enlarging the image size of a frame by a factor of 2 in the horizontal direction, into left and right images, and outputs two decoded images with the image size of a frame returned to original.

The operation of the image processor 200 according to the embodiment will be described below with reference to the flowchart of FIG. 6.

Figure 8:
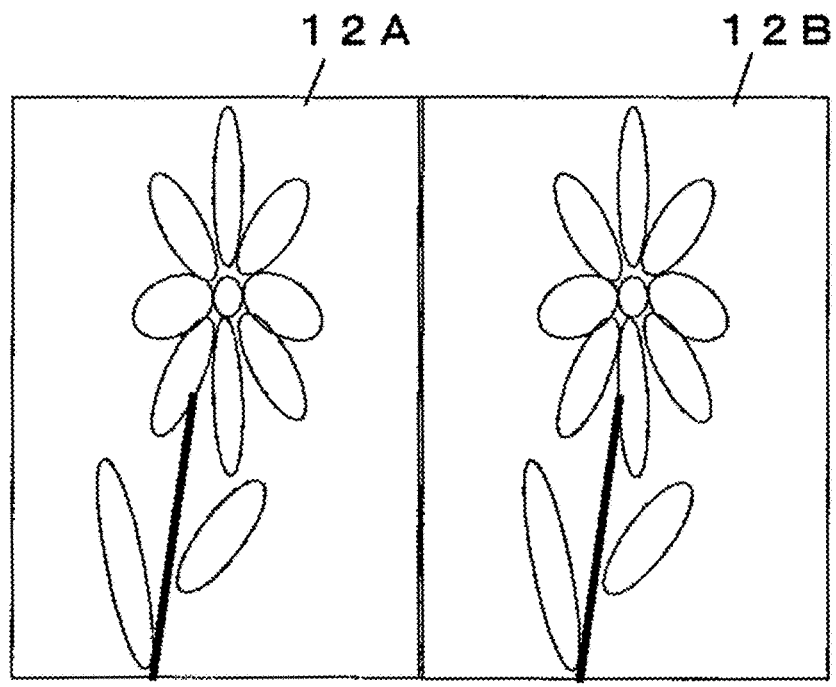
FIG. 8 shows an exemplary input image according to the second embodiment of the present invention.

First, the low-resolution image input unit 201 imports an SBS image (pre-processing, low-resolution image) as shown in FIG. 8 (step S11). Subsequently, the pixel difference sum calculators 202 and 203 calculate the pixel difference sums in the SBS image output from the low-resolution image input unit 201 (step S12). The pixel difference sum calculator 202 calculates the sum (referred to as "sub10") of the difference (or the value obtained by multiplying the difference by a constant) between the pixel value yl[4] of the pixel of interest "4" in the input SBS image shown in FIG. 9 subject to the process and the pixel value yl[0] of the pixel "0" to the upper left of the pixel of interest, the difference between yl[4] and the pixel value yl[1] of the pixel "1" above the pixel of interest, the difference between yl[4] and the pixel value yl[3] of the pixel "3" to the left of the pixel of interest, the difference (or the value obtained by multiplying the difference by a constant) between yl[4] and the pixel value yl[6] of the pixel "6" to the lower left of the pixel of interest, and the difference between yl[4] and the pixel value yl[7] of the pixel "7" below the pixel of interest.

The pixel difference sum calculator 203 calculates the sum (referred to as "sub11") of the difference (or the value obtained by multiplying the difference by a constant) between the pixel value yl[4] of the pixel of interest "4" in the input SBS image shown in FIG. 9 subject to the process and the pixel value yl[2] of the pixel "2" to the upper right of the pixel of interest, the difference between yl[4] and the pixel value yl[1] of the pixel "1" above the pixel of interest, the difference between yl[4] and the pixel value yl[5] of the pixel "5" to the right of the pixel of interest, the difference (or the value obtained by multiplying the difference by a constant) between yl[4] and the pixel value yl[8] of the pixel "8" to the lower right of the pixel of interest, and the difference between yl[4] and the pixel value yl[7] of the pixel "7" below the pixel of interest. Therefore, the pixel difference sums sub10 and sub11, which are results of calculation by the pixel difference sum calculators 202 and 203, are given by the following expressions (the predetermined constant indicated above is "0.7").

$$\mathrm{sub10}=0.7\times(yl[4]-yl[0])+(yl[4]-yl[1])+(yl[4]-yl[3])+0.7\times(yl[4]-yl[6])+(yl[4]-yl[7]) \quad (15)$$

$$\mathrm{sub11}=0.7\times(yl[4]-yl[2])+(yl[4]-yl[1])+(yl[4]-yl[5])+0.7\times(yl[4]-yl[8])+(yl[4]-yl[7]) \quad (16)$$

The pixel difference sums sub10 and sub11 represent the evaluation of differences of the pixel value yl[4] of the pixel of interest from the pixel values of the group of pixels to the left and right, respectively. By reflecting the pixel difference sums sub10 and sub11 in the high-resolution image in subsequent steps such that the differences are minimized, smoothness of variation in pixel values is increased and the Markov property is secured to a certain degree. The difference between the pixel value of the pixel of interest and the pixel value of the pixel diagonally adjacent to the pixel of interest is multiplied by a constant (exemplified by "0.7" in this case) in order to correct the impact from larger physical pixel-to-pixel distances between the pixel of interest and the diagonally adjacent pixels than the distances between the pixel of interest and the pixels vertically and horizontally adjacent to the pixel of interest. The values of pixel difference sums sub10 and sub11 are positive, negative, or 0.

Subsequently, the average value calculator 204 calculates the average value (hereinafter, referred to as "ave1") of the pixel difference sums sub10 and sub11 according to the expression below (step S13).

$$\mathrm{ave1}=(\mathrm{sub10}+\mathrm{sub11})/2 \quad (17)$$

Subsequently, the deviation calculators 205 and 206 calculate the differences between the pixel difference sums sub10 and sub11 calculated by the pixel difference sum calculators 202 and 203 provided in association with the deviation calculators 205 and 206 and the average value ave1 calculated by the average value calculator 204 (step S14). Therefore, the deviation adj10 calculated by the deviation calculator 205 and the deviation adj11 calculated by the deviation calculator 206 are given by the following expressions, respectively.

$$\mathrm{adj10}=\mathrm{sub10}-\mathrm{ave1} \quad (18)$$

$$\mathrm{adj11}=\mathrm{sub11}-\mathrm{ave1} \quad (19)$$

Subsequently, the multipliers 207 and 208 multiply the deviations adj10 and adj11 calculated by the deviation calculators 205 and 206, provided in association with the multipliers 207 and 208, by a constant K1 (step S15). The constant K1 is defined in accordance with an actual image. For example, the constant is in a range of about 0.01-0.1.

Denoting the maximum value of yl[0]-yl[8] as MAX and the minimum value as MIN, the candidate coefficient calculator 250 calculates A0-A3 and B0-B3 as follows (step S110).

When K1*adj0>MAX−yl[4], $$A0=(\mathrm{MAX}-yl[4])/(K1*\mathrm{adj0}) \quad (50)$$

When K1*adj0<0 and K1*adj0<MIN−yl[4], $$B0=(\mathrm{MIN}-yl[4])/(K1*\mathrm{adj0}) \quad (51)$$

When K1*adj0>MAX−yl[4], $$A1=(\mathrm{MAX}-yl[4])/(K1*\mathrm{adj1}) \quad (52)$$

When K1*adj1<0 and K1*adj1<MIN−yl[4], $$B1=(\mathrm{MIN}-yl[4])/(K1*\mathrm{adj1}) \quad (53)$$

The minimum coefficient derivation unit 251 derives the minimum value from A0-A1 and B0-B1 (step S111). If the minimum value is greater than 1, the minimum coefficient derivation unit 251 outputs 1. The minimum coefficient will be defined as cfe.

The minimum coefficient multipliers 252-253 multiply the result of derivation by the minimum coefficient derivation unit 251 by the outputs from the multipliers 207-208 (step S112).

Subsequently, the subtractors 209 and 210 subtract the results of multiplication by the minimum coefficient multipliers 252-253 provided in association with the subtractors 209 and 210 from the pixel value yl[4] of the pixel of interest in the SBS image imported by the low-resolution image input unit 201 (step S16). The two subtraction results obtained by the subtractors 209 and 210 indicate the pixel values (hereinafter, referred to as yh[4l] and yh[4r]) of the two pixels "4l" and "4r" in the high-resolution image obtained by enlarging the horizontal size of the pixel of interest "4" in the SBS image by a factor of 2. As shown in FIG. 10, the two pixels "4l" and "4r" are two pixels at the center of a total 18 pixels in an array including 3 pixels vertically and 6 pixels horizontally. The pixel "4l" is the post-enlargement left pixel, and the pixel "4r" is the post-enlargement right pixel.

The pixel value yh[4l] indicated by the subtraction result output from the subtractor 209 and pixel value yh[4r] indicated by the subtraction result output from the subtractor 210 are given by the following expressions, respectively.

$$yh[4l]=yl[4]-cfe*K1*\text{adj}10 \quad (20)$$

$$yh[4r]=yl[4]-cfe*K1*\text{adj}11 \quad (21)$$

The high-resolution image output unit 211 synthesizes the two subtraction results obtained by the subtractors 209 and 210 and outputs the synthesized results as the pixel values of the two pixels "4l" and "4r" in the high-resolution image obtained by enlarging the horizontal size of the pixel of interest "4" in the SBS image by a factor of 2 (step S17). The left-right separator 212 separates the high-resolution image, output from the high-resolution image output unit 211 and having the horizontal size of each pixel thereof enlarged by a factor of 2 relative to the input, into left and right images at the horizontal center. The left-right separator 212 outputs the left-eye image 11L of the original image size of one frame shown in FIG. 7 and the right-eye image 11R of the original image size one frame separately (step S18).

The total of the two deviations adj10 and adj11 represents the average of deviations from the average value ave1 and so is equal to 0. As a result, the following equation holds.

$$(yh[4l]+yh[4r])/2=yl[4] \quad (22)$$

This means that the condition for returning the high-resolution image to the original image is secured by averaging two pixels to reduce the resolution.

Multiplication by cfe in the expressions (20)-(21) ensures that yh[4l] and yh[4r] are within the range (MIN-MAX) of the pixel values in the neighborhood and enables avoiding noticeable ringing.

Thus, the embodiment is adapted for SBS image decoding characterized by low computation cost and capability to secure the Markov property to a certain degree, and enabled for reducing ringing significantly by adjusting the range of generated values to be within the range of pixel values in the neighborhood.

Third Embodiment

Figure 11:
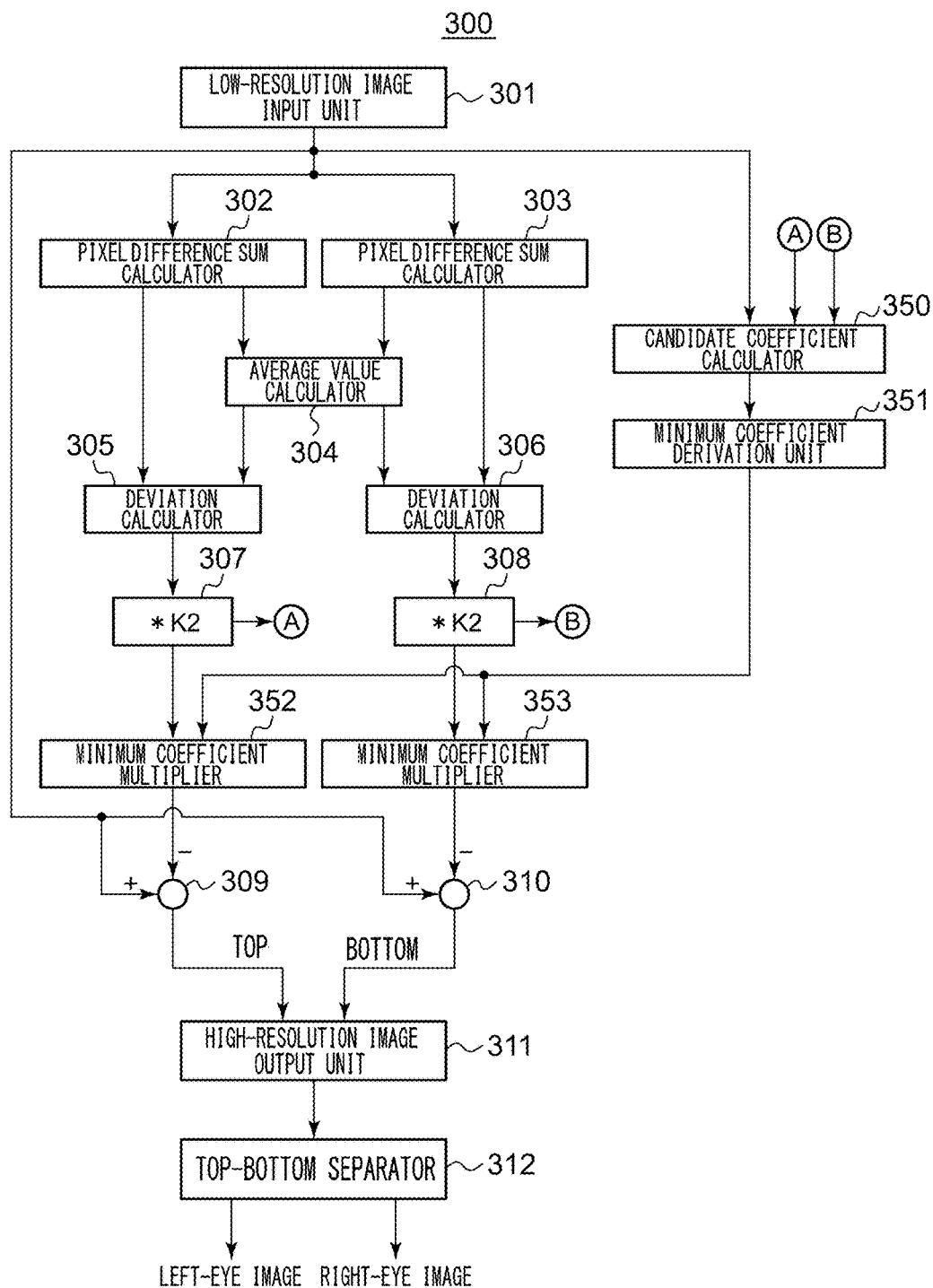
FIG. 11 is a block diagram of the image processor according to the third embodiment of the present invention.
Figure 12:
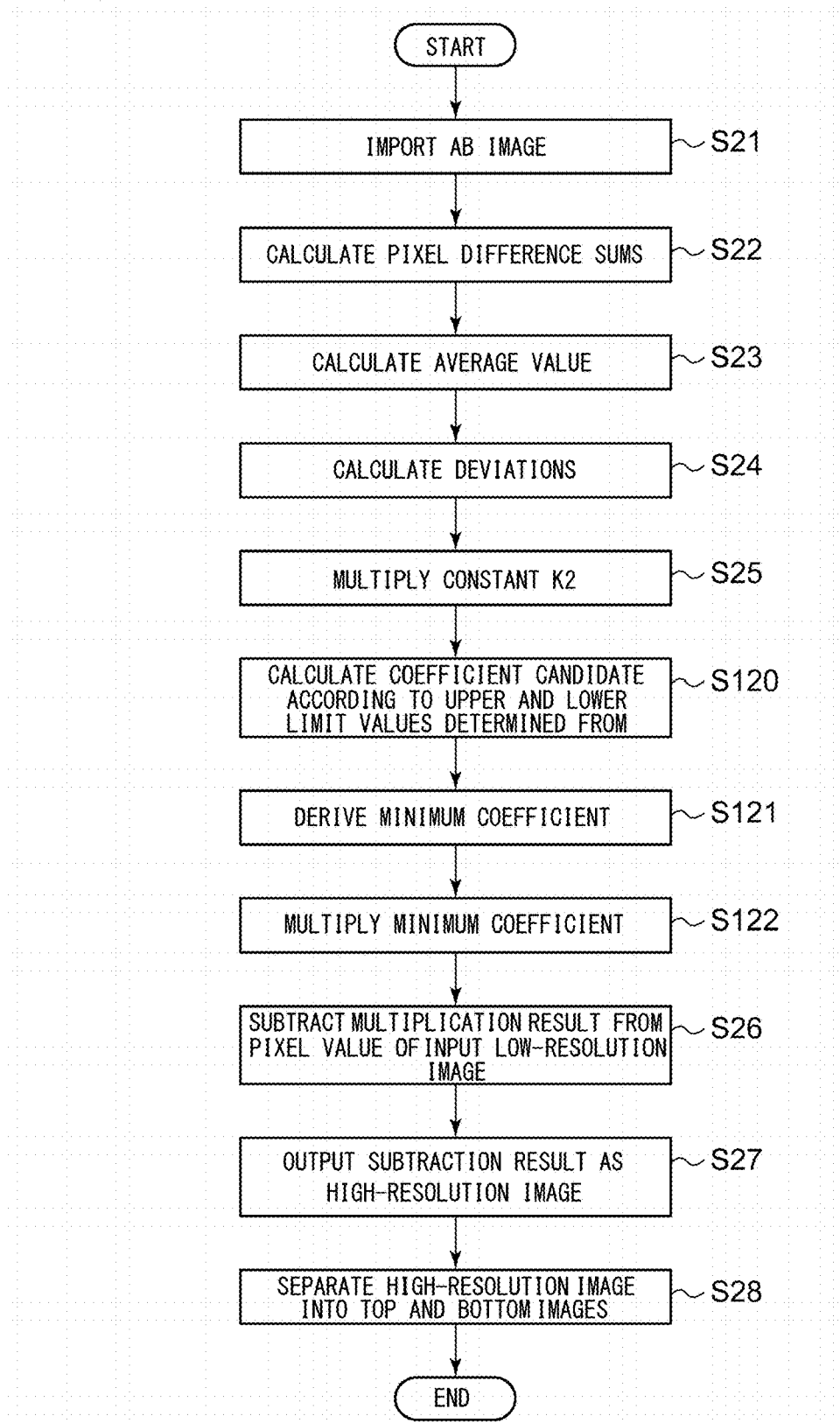
FIG. 12 is a flowchart of the image processing method according to the third embodiment of the present invention.

A description will now be given of the third embodiment of the present invention. FIG. 11 is a block diagram of the image processor according to the third embodiment of the present invention, and FIG. 12 is a flowchart of the image processing method according to the third embodiment of the present invention.

Referring to FIG. 11, an image processor 300 according to the embodiment includes a low-resolution image input unit 301, two pixel difference sum calculators 302 and 303, an average value calculator 304, two deviation calculators 305 and 306, two multipliers (corresponding to "adjusted deviation calculators") 307 and 308 provided in association with the deviation calculators 305 and 306, a candidate coefficient calculator 350 for calculating a candidate of coefficient from the results of calculation by the multipliers 307 and 308 and pixel values in the neighborhood of the input pixel, a minimum coefficient derivation unit 351 for deriving the minimum value from the result of calculation by the candidate coefficient calculator 350, minimum coefficient multipliers 352 and 353 for multiplying the result of derivation by the minimum coefficient derivation unit 351 by the outputs from the multipliers 307 and 308, two subtractors 309 and 310 provided in association with the minimum coefficient multipliers 352 and 353, a high-resolution image output unit 311 for synthesizing the signals output from the subtractors 309 and 310 and outputs the synthesized signal as a high-resolution image, and an top-bottom separator 312 for separating the high-resolution image into top and bottom images. The combination of the minimum coefficient multipliers 352, 353 and the subtractors 309, 310 corresponds to "the first and second calculators."

The low-resolution image input to and imported by the low-resolution image input unit 301 is an image of pre-processed resolution and an image (hereinafter, AB image) complying with the Above-Below (AB) scheme. An AB image is obtained by compressing two frames, including the left-eye image 11L for a frame and the right-eye image 11R for a frame (i.e., a pair of stereoscopic images) shown in FIG. 7, to ½ the original size in the vertical direction and arranging a resultant compressed left-eye image 13A and a resultant compressed right-eye image 13B shown in FIG. 13 in the vertical direction to build a frame for transmission.

It will be assumed that the image processor 300 according to the embodiment performs an image process to obtain the two stereoscopic images of the original size (the left-eye image 11L and the right-eye image 11R shown in FIG. 7) from the AB image. The following description assumes that the luminance is subject to the image process. The image process can also be applied to color difference or to primary colors. Given that the pixel of interest in the input AB image subject to the process is indicated by "4" in FIG. 9, the image processor 300 according to the embodiment performs an image process by using a total of 8 pixels indicated by "0"-"3," "5"-"8" surrounding the pixel of interest in an array of 3×3 pixels.

The pixel difference sum calculators 302 and 303 calculate the sum of differences between the pixel value of the pixel of interest and the pixel values (or the value obtained by multiplying the pixel values by a constant) of predetermined surrounding pixels. The average value calculator 304 calculates the average value of the two pixel difference sums output from the pixel difference sum calculators 302 and 303. The deviation calculators 305 and 306 calculate the deviations defined as differences between the pixel difference sums from the pixel difference sum calculators 302 and 303 provided in association with the deviation calculators 305 and 306 and the average value output from the average value calculator 304. The multipliers 307 and 308 multiply the deviations output from the deviation calculators 305 and 306 provided in association with the multipliers 307 and 308 by a constant K2. The candidate coefficient calculator 350 calculates a candidate of coefficient used in the succeeding stage, using the results of multiplication by the multipliers 307-308 and the pixel values of "0"-"8." The minimum coefficient derivation unit 351 derives the minimum value from the result of calculation by the candidate coefficient calculator 350. The minimum coefficient multipliers 352-353 multiply the result of derivation by the minimum coefficient derivation unit 351 by the outputs from the multipliers 307-308. The subtractors 309 and 310 subtract the results of multiplication output from the minimum coefficient multipliers 352-353 provided in association with the subtractors 309 and 310 from the pixel value of the low-resolution image input to the low-resolution image input unit 301. Each of the subtractors 309 and 310 outputs the pixel value of a pixel resulting from enlarging the image size of one frame by a factor of 2 in the vertical direction. The top-bottom separator 312 separates the high-resolution image, output from the high-resolution image output unit 311 and including pixels resulting from enlarging the image size of one frame by a factor of 2 in the vertical direction, into top and bottom images, and outputs two decoded images with the image size of one frame returned to original.

The operation of the image processor 300 according to the embodiment will be described below with reference to the flowchart of FIG. 12.

Figures 13, 14:
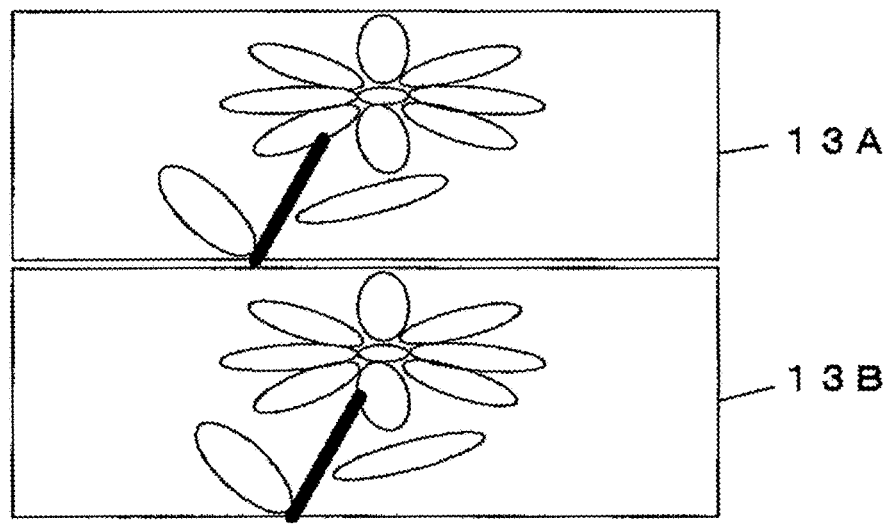
FIG. 13 shows an exemplary input image according to the third embodiment of the present invention.
FIG. 14 shows an array of pixels in an enlarged image obtained according to the third embodiment of the present invention.

First, the low-resolution image input unit 301 imports an AB image (pre-processing, low-resolution image) as shown in FIG. 13 (step S21). Subsequently, the pixel difference sum calculators 302 and 303 calculate the pixel difference sums in the AB image output from the low-resolution image input unit 301 (step S22). The pixel difference sum calculator 302 calculates the sum (referred to as "sub20") of the difference (or the value obtained by multiplying the difference by a constant) between the pixel value yl[4] of the pixel of interest "4" in the input AB image shown in FIG. 9 subject to the process and the pixel value yl[0] of the pixel "0" to the upper left of the pixel of interest, the difference between yl[4] and the pixel value yl[1] of the pixel "1" above the pixel of interest, the difference (or the value obtained by multiplying the difference by a constant) between yl[4] and the pixel value yl[2] of the pixel "2" to the upper right of the pixel of interest, the difference between yl[4] and the pixel value yl[3] of the pixel "3" to the left of the pixel of interest, and the difference between yl[4] and the pixel value yl[5] of the pixel "5" to the right of the pixel of interest.

The pixel difference sum calculator 303 calculates the sum (referred to as "sub21") of the difference (or the value obtained by multiplying the difference by a constant) between the pixel value yl[4] of the pixel of interest "4" in the input AB image shown in FIG. 9 subject to the process and the pixel value yl[6] of the pixel "6" to the lower left of the pixel of interest, the difference between yl[4] and the pixel value yl[3] of the pixel "3" to the left of the pixel of interest, the difference between yl[4] and the pixel value yl[5] of the pixel "5" to the right of the pixel of interest, the difference (or the value obtained by multiplying the difference by a constant) between yl[4] and the pixel value yl[8] of the pixel "8" to the lower right of the pixel of interest, and the difference between yl[4] and the pixel value yl[7] of the pixel "7" below the pixel of interest. Therefore, the pixel difference sums sub20 and sub21, which are results of calculation by the pixel difference sum calculators 202 and 203, are given by the following expressions (the predetermined constant indicated above is "0.7").

$$sub20=0.7\times(yl[4]-yl[0])+(yl[4]-yl[1])+0.7\times(yl[4]-yl[2])+(yl[4]-yl[3])+(yl[4]-yl[5]) \quad (23)$$

$$sub21=(yl[4]-yl[3])+(yl[4]-yl[5])+0.7\times(yl[4]-yl[6])+(yl[4]-yl[7])+(yl[4]-yl[8]) \quad (24)$$

The pixel difference sums sub20 and sub21 represent the evaluation of differences of the pixel value yl[4] of the pixel of interest from the pixel values of the group of pixels above and below, respectively. By reflecting the pixel difference sums sub20 and sub21 in the high-resolution image in subsequent steps such that the differences are minimized, smoothness of variation in pixel values is increased and the Markov property is secured to a certain degree. The difference between the pixel value of the pixel of interest and the pixel value of the pixel diagonally adjacent to the pixel of interest is multiplied by a constant (exemplified by "0.7" in this case) in order to correct the impact from larger physical pixel-to-pixel distances between the pixel of interest and the diagonally adjacent pixels than the distances between the pixel of interest and the pixels vertically and horizontally adjacent to the pixel of interest. The values of pixel difference sums sub20 and sub21 are positive, negative, or 0.

Subsequently, the average value calculator 304 calculates the average value (hereinafter, referred to as "ave2") of the pixel difference sums sub20 and sub21 according to the expression below (step S23).

$$ave2=(sub20+sub21)/2 \quad (25)$$

Subsequently, the deviation calculators 305 and 306 calculate the differences between the pixel difference sums sub20 and sub21 calculated by the pixel difference sum calculators 302 and 303 provided in association with the deviation calculators 305 and 306 and the average value ave2 calculated by the average value calculator 304 (step S24). Therefore, the deviation adj20 calculated by the deviation calculator 305 and the deviation adj21 calculated by the deviation calculator 306 are given by the following expressions, respectively.

$$adj20=sub20-ave2 \quad (26)$$

$$adj21=sub21-ave2 \quad (27)$$

Subsequently, the multipliers 307 and 308 multiply the deviations adj20 and adj21 calculated by the deviation calculators 305 and 306, provided in association with the multipliers 307 and 308, by a constant K2 (step S25). The constant K2 is defined in accordance with an actual image. For example, the constant is in a range of about 0.01-0.1.

Denoting the maximum value of yl[0]-yl[8] as MAX and the minimum value as MIN, the candidate coefficient calculator 350 calculates A0-A3 and B0-B3 as follows (step S120).

When $K2*adj0>MAX-yl[4]$, $$A0=(MAX-yl[4])/(K2*adj0) \quad (70)$$

When $K2*adj0<0$ and $K2*adj0<MIN-yl[4]$, $$B0=(MIN-yl[4])/(K2*adj0) \quad (61)$$

When $K2*adj0>MAX-yl[4]$, $$A1=(MAX-yl[4])/(K2*adj1) \quad (62)$$

When $K2*adj1<0$ and $K2*adj1<MIN-yl[4]$, $$B1=(MIN-yl[4])/(K2*adj1) \quad (63)$$

The minimum coefficient derivation unit 351 derives the minimum value from A0-A1 and B0-B1 (step S121). If the minimum value is greater than 1, the minimum coefficient derivation unit 351 outputs 1. The minimum coefficient will be defined as cfe.

The minimum coefficient multipliers 352-353 multiply the result of derivation by the minimum coefficient derivation unit 351 by the outputs from the multipliers 307-308 (step S122).

Subsequently, the subtractors 309 and 310 subtract the results of multiplication by the minimum coefficient multipliers 352-353 provided in association with the subtractors 309 and 310 from the pixel value yl[4] of the pixel of interest in the AB image imported by the low-resolution image input unit 301 (step S26). The two subtraction results obtained by the subtractors 309 and 310 indicate the pixel values (hereinafter, referred to as yh[4a] and yh[4b]) of the two pixels "4a" and "4b" in the high-resolution image obtained by enlarging the vertical size of the pixel of interest "4" in the AB image by a factor of 2. As shown in FIG. 14, the two pixels "4a" and "4b" are two pixels at the center of a total 18 pixels in an array including 6 pixels vertically and 3 pixels horizontally. The pixel "4a" is the post-enlargement pixel above, and the pixel "4b" is the post-enlargement pixel below.

The pixel value yh[4a] indicated by the subtraction result output from the subtractor 309 and pixel value yh[4b] indicated by the subtraction result output from the subtractor 310 are given by the following expressions, respectively.

$$yh[4a]=yl[4]-cfe*K2*\text{adj}20 \tag{28}$$

$$yh[4b]=yl[4]-cfe*K2*\text{adj}21 \tag{29}$$

The high-resolution image output unit 311 synthesizes the two subtraction results obtained by the subtractors 309 and 310 and outputs the synthesized results as the pixel values of the two pixels "4a" and "4b" in the high-resolution image obtained by enlarging the vertical size of the pixel of interest "4" in the AB image by a factor of 2 (step S27). The top-bottom separator 312 separates the high-resolution image, output from the high-resolution image output unit 311 and having the vertical size of each pixel thereof enlarged by a factor of 2 relative to the input, into top and bottom images at the vertical center. The top-bottom separator 312 outputs the left-eye image 11L of the original image size of one frame shown in FIG. 7 and the right-eye image 11R of the original image size one frame separately (step S28).

The total of the two deviations adj20 and adj21 represents the average of deviations from the average value ave2 and so is equal to 0. As a result, the following equation holds.

$$(yh[4a]+yh[4b])/2=yl[4] \tag{30}$$

This means that the condition for returning the high-resolution image to the original image is secured by averaging two pixels to reduce the resolution.

Multiplication by cfe in the expressions (28)-(29) ensures that yh[4a] and yh[4b] are within the range (MIN-MAX) of the pixel values in the neighborhood and enables avoiding noticeable ringing.

Thus, the embodiment is adapted for AB image decoding characterized by low computation cost and capability to secure the Markov property to a certain degree, and enabled for reducing ringing significantly by adjusting the range of generated values to be within the range of pixel values in the neighborhood.

A possible side effect from reducing ringing in the inventive process is jagging at the contour. In this case, the problem can be solved by performing a local process based on the directionality of the original image and by using, for example, directional Gaussian described at the following URL. http://jp.mathworks.com/help/images/apply-gaussian-smoothing-filters-to-images.html In the first through third embodiments, an upper limit value larger than the maximum value by a predetermined value or a lower limit value smaller than the minimum value by a predetermined value may be used in place of the maximum value MAX and the minimum value MIN, respectively.

FIG. 15 is an exemplary process result according to the first embodiment disclosed in patent document 1. The input image is a stripe pattern of black and gray. The enlarged image resulting from increasing the resolution is an image of black, white, and gray stripes. It can be see that ringing occurs at the edges.

FIG. 16 is an exemplary process result according to the first embodiment of the present invention. As in the case of FIG. 15, the figure shows a result of providing an input image and increasing the resolution of the input image. It can be see that ringing is inhibited at the edges of the enlarged image.

Described above is an explanation based on an exemplary embodiment. The embodiment is intended to be illustrative only and it will be obvious to those skilled in the art that various modifications to constituting elements and processes could be developed and that such modifications are also within the scope of the present invention.

The functions and configurations of the devices described in the embodiments can be realized by hardware resources or software resources, or a combination of hardware resources and software resources. Processors, ROMs, RAMS, and other LSIs can be used as hardware resources. Programs like operating systems, applications, etc. can be used as software resources.

What is claimed is:

1. An image processing method implemented by an image processor coupled to a memory device, the memory device stores executable instructions that, when executed by the image processor, causes the processor to perform processes comprising:

importing, by an image input unit, an image input;

calculating, by a first pixel difference sum calculator, a first pixel difference sum of three differences identified between a pixel value of a pixel of interest subject to a process in the input image and pixel values of three pixels to the upper left of, to the left of, and above the pixel of interest;

calculating, by a second pixel difference sum calculator, a second pixel difference sum of three differences identified between the pixel value of the pixel of interest subject to the process in the input image and pixel values of three pixels to the upper right of, above, and to the right of the pixel of interest;

calculating, by a third pixel difference sum calculator, a third pixel difference sum of three differences identified between the pixel value of the pixel of interest subject to the process in the input image and pixel values of three pixels to the lower left of, to the left of, and below the pixel of interest;

calculating, by a fourth pixel difference sum calculator, a fourth pixel difference sum of three differences identified between the pixel value of the pixel of interest subject to the process in the input image and pixel values of three pixels to the lower right of, to the right of, and below the pixel of interest;

calculating, by an average value calculator, an average value of the first through fourth pixel difference sums;

calculating, by a first deviation calculator, a first deviation by subtracting the average value from the first pixel difference sum, calculating, by a second deviation calculator, a second deviation by subtracting the average value from the second pixel difference sum, calculating, by a third deviation calculator, a third deviation by subtracting the average value from the third pixel difference sum, and calculating, by a fourth deviation calculator, a fourth deviation by subtracting the average value from the fourth pixel difference sum;

determining, by a first through fourth multiplier, a first through fourth adjusted deviations by respectively multiplying the first through fourth deviations by a constant;

performing, by a candidate coefficient calculator, a candidate coefficient calculation of determining an upper limit value and a lower limit value based on the maximum value and minimum value of the pixel values of the pixel of interest subject to the process and adjacent pixels in the input image;

calculating, by a fifth deviation calculator, a fifth deviation by subtracting the pixel value of the pixel of interest subject to the process in the input image from the upper limit value;

calculating, by a sixth deviation calculator, a sixth deviation by subtracting the pixel value of the pixel of interest subject to the process in the input image from the lower limit value;

when the first adjusted deviation is positive and larger than the fifth deviation, determining, by the candidate coefficient calculator, A0 resulting from dividing the fifth deviation by the first adjusted deviation as a candidate of coefficient;

when the first adjusted deviation is negative and smaller than the sixth deviation, determining, by the candidate coefficient calculator, B0 resulting from dividing the sixth deviation by the first adjusted deviation as a candidate of coefficient;

when the second adjusted deviation is positive and larger than the fifth deviation, determining, by the candidate coefficient calculator, A1 resulting from dividing the fifth deviation by the second adjusted deviation as a candidate of coefficient;

when the second adjusted deviation is negative and smaller than the sixth deviation, determining, by the candidate coefficient calculator, B1 resulting from dividing the sixth deviation by the second adjusted deviation as a candidate of coefficient;

when the third adjusted deviation is positive and larger than the fifth deviation, determining, by the candidate coefficient calculator, A2 resulting from dividing the fifth deviation by the third adjusted deviation as a candidate of coefficient;

when the third adjusted deviation is negative and smaller than the sixth deviation, determining, by the candidate coefficient calculator, B2 resulting from dividing the sixth deviation by the third adjusted deviation as a candidate of coefficient;

when the fourth adjusted deviation is positive and larger than the fifth deviation, determining, by the candidate coefficient calculator, A3 resulting from dividing the fifth deviation by the fourth adjusted deviation as a candidate of coefficient;

when the fourth adjusted deviation is negative and smaller than the sixth deviation, determining, by the candidate coefficient calculator, B3 resulting from dividing the sixth deviation by the fourth adjusted deviation as a candidate of coefficient;

deriving, by the minimum coefficient derivation unit, the minimum of the candidates of coefficient A0-A3 and B0-B3 as the minimum coefficient;

performing, by a first calculator, a first calculation of subtracting a value derived from multiplying the first adjusted deviation by the minimum coefficient from the pixel value of the pixel of interest subject to the process in the input image, thereby obtaining a pixel value of a top left pixel of four pixels, in an enlarged image twice the size of the input image both in horizontal and vertical directions, located at positions corresponding to the pixel of interest and having the same size as the pixel of interest;

performing, by a second calculator, a second calculation of subtracting a value derived from multiplying the second adjusted deviation by the minimum coefficient from the pixel value of the pixel of interest subject to the process in the input image, thereby obtaining a pixel value of a top right pixel of the four pixels in the enlarged image;

performing, by a third calculator, a third calculation of subtracting a value derived from multiplying the third adjusted deviation by the minimum coefficient from the pixel value of the pixel of interest subject to the process in the input image, thereby obtaining a pixel value of a bottom left pixel of the four pixels in the enlarged image;

performing, by a fourth calculator, a fourth calculation of subtracting a value derived from multiplying the fourth adjusted deviation by the minimum coefficient from the pixel value of the pixel of interest subject to the process in the input image, thereby obtaining a pixel value of a bottom right pixel of the four pixels in the enlarged image; and outputting, by an image output unit, calculation results as an image output.

2. An image processing method implemented by an image processor coupled to a memory device, the memory device stores executable instructions that, when executed by the image processor, causes the processor to perform processes comprising:

importing, by an image input unit, an image input;

calculating, by a first pixel difference sum calculator, a first pixel difference sum of five differences identified between a pixel value of a pixel of interest subject to a process in the input image and pixel values of five pixels to the upper left of, to the left of, above, to the lower left of, and below the pixel of interest, the input image including compressed stereoscopic images obtained by compressing a pair of stereoscopic images to ½ an original size in a horizontal direction and arranged in a horizontal direction to build one image;

calculating, by a second pixel difference sum calculator, a second pixel difference sum of five differences identified between the pixel value of the pixel of interest subject to the process in the input image and pixel values of five pixels to the upper right of, above, to the right of, to the lower right of, and below the pixel of interest;

calculating, by an average value calculator, an average value of the first and second pixel difference sums;

calculating, by a first deviation calculator, a first deviation by subtracting the average value from the first pixel difference sum;

calculating, by a second deviation calculator, a second deviation by subtracting the average value from the second pixel difference sum;

determining, by a first and second multiplier, first and second adjusted deviations by respectively multiplying the first and second deviations by a constant;

performing, by a candidate coefficient calculator, a candidate coefficient calculation of determining an upper limit value and a lower limit value based on the maximum value and minimum value of the pixel values of the pixel of interest subject to the process and adjacent pixels in the input image;

calculating, by a third deviation calculator, a third deviation by subtracting the pixel value of the pixel of interest subject to the process in the input image from the upper limit value;

calculating, by a fourth deviation calculator, a fourth deviation by subtracting the pixel value of the pixel of interest subject to the process in the input image from the lower limit value;

when the first adjusted deviation is positive and larger than the third deviation, determining, by the candidate coefficient calculator, A0 resulting from dividing the third deviation by the first adjusted deviation as a candidate of coefficient;

when the first adjusted deviation is negative and smaller than the fourth deviation, determining, by the candidate coefficient calculator, B0 resulting from dividing the fourth deviation by the first adjusted deviation as a candidate of coefficient;

when the second adjusted deviation is positive and larger than the third deviation, determining, by the candidate coefficient calculator, A1 resulting from dividing the third deviation by the second adjusted deviation as a candidate of coefficient;

when the second adjusted deviation is negative and smaller than the fourth deviation, determining, by the candidate coefficient calculator, B1 resulting from dividing the fourth deviation by the second adjusted deviation as a candidate of coefficient;

deriving, by the minimum coefficient derivation unit, the minimum of the candidates of coefficient A0, A1, B0, and B1 as the minimum coefficient;

performing, by a first calculator, a first calculation of subtracting a value derived from multiplying the first adjusted deviation by the minimum coefficient from the pixel value of the pixel of interest subject to the process in the input image, thereby obtaining a pixel value of a left pixel of two pixels, in an enlarged image twice the size of the input image in a horizontal direction, located at positions corresponding to the pixel of interest and having the same size as the pixel of interest;

performing, by a second calculator, a second calculation of subtracting a value derived from multiplying the second adjusted deviation by the minimum coefficient from the pixel value of the pixel of interest subject to the process in the input image, thereby obtaining a pixel value of a right pixel of the two pixels in the enlarged image;

separating, by a separator, the enlarged image obtained by the first and second calculations into left and right images; and outputting, by an image output unit, the pair of stereoscopic images separately.

3. An image processing method implemented by an image processor coupled to a memory device, the memory device stores executable instructions that, when executed by the image processor, causes the processor to perform processes comprising:

importing, by an image input unit, an image input;

calculating, by a first pixel difference sum calculator, a first pixel difference sum of five differences identified between a pixel value of a pixel of interest subject to a process in the input image and pixel values of five pixels to the upper left of, above, to the upper right of, to the left of, and to the right of the pixel of interest, the input image including compressed stereoscopic images obtained by compressing a pair of stereoscopic images to ½ an original size in a vertical direction and arranged in a vertical direction to build one image;

calculating, by a second pixel difference sum calculator, a second pixel difference sum of five differences identified between the pixel value of the pixel of interest subject to the process in the input image and pixel values of five pixels to the lower left of, below, to the lower right of, to the left of, and to the right of the pixel of interest;

calculating, by an average value calculator, an average value of the first and second pixel difference sums;

calculating, by a first deviation calculator, a first deviation by subtracting the average value from the first pixel difference sum;

calculating, by a second deviation calculator, a second deviation by subtracting the average value from the second pixel difference sum;

determining, by a first and second multiplier, first and second adjusted deviations by respectively multiplying the first and second deviations by a constant;

performing, by a candidate coefficient calculator, a candidate coefficient calculation of determining an upper limit value and a lower limit value based on the maximum value and minimum value of the pixel values of the pixel of interest subject to the process and adjacent pixels in the input image;

calculating, by a third deviation calculator, a third deviation by subtracting the pixel value of the pixel of interest subject to the process in the input image from the upper limit value;

calculating, by a fourth deviation calculator, a fourth deviation by subtracting the pixel value of the pixel of interest subject to the process in the input image from the lower limit value;

when the first adjusted deviation is positive and larger than the third deviation, determining, by the candidate coefficient calculator, A0 resulting from dividing the third deviation by the first adjusted deviation as a candidate of coefficient;

when the first adjusted deviation is negative and smaller than the fourth deviation, determining, by the candidate coefficient calculator, B0 resulting from dividing the fourth deviation by the first adjusted deviation as a candidate of coefficient;

when the second adjusted deviation is positive and larger than the third deviation, determining, by the candidate coefficient calculator, A1 resulting from dividing the third deviation by the second adjusted deviation as a candidate of coefficient, and when the second adjusted deviation is negative and smaller than the fourth deviation, determining, by the candidate coefficient calculator, B1 resulting from dividing the fourth deviation by the second adjusted deviation as a candidate of coefficient;

deriving, by the minimum coefficient derivation unit, the minimum of the candidates of coefficient A0, A1, B0, and B1 as the minimum coefficient;

performing, by a first calculator, a first calculation of subtracting a value derived from multiplying the first adjusted deviation by the minimum coefficient from the pixel value of the pixel of interest subject to the process in the input image, thereby obtaining a pixel value of a top pixel of two pixels, in an enlarged image twice the size of the input image in a vertical direction, located at positions corresponding to the pixel of interest and having the same size as the pixel of interest;

performing, by a second calculator, a second calculation of subtracting a value derived from multiplying the second adjusted deviation by the minimum coefficient from the pixel value of the pixel of interest subject to the process in the input image, thereby obtaining a pixel value of a bottom pixel of the two pixels in the enlarged image; and separating, by a separator, the enlarged image obtained by the first and second calculations into top and bottom images; and outputting, by an image output unit, the pair of stereoscopic images separately.

4. An image processor coupled to a memory device, the memory device stores executable instructions that, when executed by the image processor, causes the image processor to perform image processing, the image processor comprising:

an image input unit that imports an image input;

a first pixel difference sum calculator that calculates a first pixel difference sum of three differences identified between a pixel value of a pixel of interest subject to a process in an input image and pixel values of three pixels to the upper left of, to the left of, and above the pixel of interest;

a second pixel difference sum calculator that calculates a second pixel difference sum of three differences identified between the pixel value of the pixel of interest subject to the process in the input image and pixel values of three pixels to the upper right of, above, and to the right of the pixel of interest;

a third pixel difference sum calculator that calculates a third pixel difference sum of three differences identified between the pixel value of the pixel of interest subject to the process in the input image and pixel values of three pixels to the lower left of, to the left of, and below the pixel of interest;

a fourth pixel difference sum calculator that calculates a fourth pixel difference sum of three differences identified between the pixel value of the pixel of interest subject to the process in the input image and pixel values of three pixels to the lower right of, to the right of, and below the pixel of interest;

an average value calculator that calculates an average value of the first through fourth pixel difference sums;

a first deviation calculator that calculates a first deviation by subtracting the average value from the first pixel difference sum;

a second deviation calculator that calculates a second deviation by subtracting the average value from the second pixel difference sum;

a third deviation calculator that calculates a third deviation by subtracting the average value from the third pixel difference sum;

a fourth deviation calculator that calculates a fourth deviation by subtracting the average value from the fourth pixel difference sum;

a first through fourth multiplier that determines first through fourth adjusted deviations by respectively multiplying the first through fourth deviations by a constant;

a candidate coefficient calculator that determines an upper limit value and a lower limit value based on the maximum value and minimum value of the pixel values of the pixel of interest subject to the process and adjacent pixels in the input image;

a fifth deviation calculator that calculates a fifth deviation by subtracting the pixel value of the pixel of interest subject to the process in the input image from the upper limit value; and a sixth deviation calculator that calculates a sixth deviation by subtracting the pixel value of the pixel of interest subject to the process in the input image from the lower limit value;

wherein when the first adjusted deviation is positive and larger than the fifth deviation, the candidate coefficient calculator determines A0 resulting from dividing the fifth deviation by the first adjusted deviation as a candidate of coefficient;

wherein when the first adjusted deviation is negative and smaller than the sixth deviation, the candidate coefficient calculator determines B0 resulting from dividing the sixth deviation by the first adjusted deviation as a candidate of coefficient;

wherein when the second adjusted deviation is positive and larger than the fifth deviation, the candidate coefficient calculator determines A1 resulting from dividing the fifth deviation by the second adjusted deviation as a candidate of coefficient;

wherein when the second adjusted deviation is negative and smaller than the sixth deviation, the candidate coefficient calculator determines B1 resulting from dividing the sixth deviation by the second adjusted deviation as a candidate of coefficient;

wherein when the third adjusted deviation is positive and larger than the fifth deviation, the candidate coefficient calculator determines A2 resulting from dividing the fifth deviation by the third adjusted deviation as a candidate of coefficient;

wherein when the third adjusted deviation is negative and smaller than the sixth deviation, the candidate coefficient calculator determines B2 resulting from dividing the sixth deviation by the third adjusted deviation as a candidate of coefficient;

wherein when the fourth adjusted deviation is positive and larger than the fifth deviation, the candidate coefficient calculator determines A3 resulting from dividing the fifth deviation by the fourth adjusted deviation as a candidate of coefficient;

wherein when the fourth adjusted deviation is negative and smaller than the sixth deviation, the candidate coefficient calculator determines B3 resulting from dividing the sixth deviation by the fourth adjusted deviation as a candidate of coefficient;

a minimum coefficient derivation unit that derives the minimum of the candidates of coefficient A0-A3 and B0-B3 as the minimum coefficient;

a first calculator that subtracts a value derived from multiplying the first adjusted deviation by the minimum coefficient from the pixel value of the pixel of interest subject to the process in the input image, thereby obtaining a pixel value of a top left pixel of four pixels, in an enlarged image twice the size of the input image both in horizontal and vertical directions, located at positions corresponding to the pixel of interest and having the same size as the pixel of interest;

a second calculator that subtracts a value derived from multiplying the second adjusted deviation by the minimum coefficient from the pixel value of the pixel of interest subject to the process in the input image, thereby obtaining a pixel value of a top right pixel of the four pixels in the enlarged image;

a third calculator that subtracts a value derived from multiplying the third adjusted deviation by the minimum coefficient from the pixel value of the pixel of interest subject to the process in the input image, thereby obtaining a pixel value of a bottom left pixel of the four pixels in the enlarged image;

a fourth calculator that subtracts a value derived from multiplying the fourth adjusted deviation by the minimum coefficient from the pixel value of the pixel of interest subject to the process in the input image, thereby obtaining a pixel value of a bottom right pixel of the four pixels in the enlarged image; and an image output unit that outputs calculation results as an image output.

5. An image processor coupled to a memory device, the memory device stores executable instructions that, when executed by the image processor, causes the image processor to perform image processing, the image processor comprising:

an image input unit that imports an image input;

a first pixel difference sum calculator that calculates a first pixel difference sum of five differences identified between a pixel value of a pixel of interest subject to a process in an input image and pixel values of five pixels to the upper left of, to the left of, above, to the lower left of, and below the pixel of interest, the input image including compressed stereoscopic images obtained by compressing a pair of stereoscopic images to ½ an original size in a horizontal direction and arranged in a horizontal direction to build one image;

a second pixel difference sum calculator that calculates a second pixel difference sum of five differences identified between the pixel value of the pixel of interest subject to the process in the input image and pixel values of five pixels to the upper right of, above, to the right of, to the lower right of, and below the pixel of interest;

an average value calculator that calculates an average value of the first and second pixel difference sums;

a first deviation calculator that calculates a first deviation by subtracting the average value from the first pixel difference sum;

a second deviation calculator that calculates a second deviation by subtracting the average value from the second pixel difference sum;

a first and second multiplier that determines a first and second adjusted deviations by respectively multiplying the first and second deviations by a constant;

a candidate coefficient calculator that determines an upper limit value and a lower limit value based on the maximum value and minimum value of the pixel values of the pixel of interest subject to the process and adjacent pixels in the input image;

a third deviation calculator that calculates a third deviation by subtracting the pixel value of the pixel of interest subject to the process in the input image from the upper limit value;

a fourth deviation calculator that calculates a fourth deviation by subtracting the pixel value of the pixel of interest subject to the process in the input image from the lower limit value;

wherein when the first adjusted deviation is positive and larger than the third deviation, the candidate coefficient calculator determines A0 resulting from dividing the third deviation by the first adjusted deviation as a candidate of coefficient;

wherein when the first adjusted deviation is negative and smaller than the fourth deviation, the candidate coefficient calculator determines B0 resulting from dividing the fourth deviation by the first adjusted deviation as a candidate of coefficient;

wherein when the second adjusted deviation is positive and larger than the third deviation, the candidate coefficient calculator determines A1 resulting from dividing the third deviation by the second adjusted deviation as a candidate of coefficient;

wherein when the second adjusted deviation is negative and smaller than the fourth deviation, the candidate coefficient calculator determines B1 resulting from dividing the fourth deviation by the second adjusted deviation as a candidate of coefficient;

a minimum coefficient derivation unit that derives the minimum of the candidates of coefficient A0, A1, B0, and B1 as the minimum coefficient;

a first calculator that subtracts a value derived from multiplying the first adjusted deviation by the minimum coefficient from the pixel value of the pixel of interest subject to the process in the input image, thereby obtaining a pixel value of a left pixel of two pixels, in an enlarged image twice the size of the input image in a horizontal direction, located at positions corresponding to the pixel of interest and having the same size as the pixel of interest;

a second calculator that subtracts a value derived from multiplying the second adjusted deviation by the minimum coefficient from the pixel value of the pixel of interest subject to the process in the input image, thereby obtaining a pixel value of a right pixel of the two pixels in the enlarged image;

a left-right separator that separates the enlarged image obtained by the first and second calculators into left and right images; and an image output unit that outputs the pair of stereoscopic images separately.

6. An image processor coupled to a memory device, the memory device stores executable instructions that, when executed by the image processor, causes the image processor to perform image processing, the image processor comprising:

an image input unit that imports an image input;

a first pixel difference sum calculator that calculates a first pixel difference sum of five differences identified between a pixel value of a pixel of interest subject to a process in an input image and pixel values of five pixels to the upper left of, above, to the upper right of, to the left of, and to the right of the pixel of interest, the input image including compressed stereoscopic images obtained by compressing a pair of stereoscopic images to ½ an original size in a vertical direction and arranged in a vertical direction to build one image;

a second pixel difference sum calculator that calculates a second pixel difference sum of five differences identified between the pixel value of the pixel of interest subject to the process in the input image and pixel values of five pixels to the lower left of, below, to the lower right of, to the left of, and to the right of the pixel of interest;

an average value calculator that calculates an average value of the first and second pixel difference sums;

a first deviation calculator that calculates a first deviation by subtracting the average value from the first pixel difference sum;

a second deviation calculator that calculates a second deviation by subtracting the average value from the second pixel difference sum;

a first and second multiplier that determines a first and second adjusted deviations by respectively multiplying the first and second deviations by a constant;

a candidate coefficient calculator that determines an upper limit value and a lower limit value based on the maximum value and minimum value of the pixel values of the pixel of interest subject to the process and adjacent pixels in the input image;

a third deviation calculator that calculates a third deviation by subtracting the pixel value of the pixel of interest subject to the process in the input image from the upper limit value;

a fourth deviation calculator that calculates a fourth deviation by subtracting the pixel value of the pixel of interest subject to the process in the input image from the lower limit value;

wherein when the first adjusted deviation is positive and larger than the third deviation, the candidate coefficient calculator determines A0 resulting from dividing the third deviation by the first adjusted deviation as a candidate of coefficient, wherein when the first adjusted deviation is negative and smaller than the fourth deviation, the candidate coefficient calculator determines B0 resulting from dividing the fourth deviation by the first adjusted deviation as a candidate of coefficient, wherein when the second adjusted deviation is positive and larger than the third deviation, the candidate coefficient calculator determines A1 resulting from dividing the third deviation by the second adjusted deviation as a candidate of coefficient, and wherein when the second adjusted deviation is negative and smaller than the fourth deviation, the candidate coefficient calculator determines B1 resulting from dividing the fourth deviation by the second adjusted deviation as a candidate of coefficient;

a minimum coefficient derivation unit that derives the minimum of the candidates of coefficient A0, A1, B0, and B1 as the minimum coefficient;

a first calculator that subtracts a value derived from multiplying the first adjusted deviation by the minimum coefficient from the pixel value of the pixel of interest subject to the process in the input image, thereby obtaining a pixel value of a top pixel of two pixels, in an enlarged image twice the size of the input image in a vertical direction, located at positions corresponding to the pixel of interest and having the same size as the pixel of interest;

a second calculator that subtracts a value derived from multiplying the second adjusted deviation by the minimum coefficient from the pixel value of the pixel of interest subject to the process in the input image, thereby obtaining pixel value of a bottom pixel of the two pixels in the enlarged image;

a top-bottom separator that separates the enlarged image obtained by the first and second calculators into top and bottom images; and an image output unit that outputs the pair of stereoscopic images separately.

* * * * *